United States Patent
Abu Lebdeh et al.

(10) Patent No.: US 11,032,135 B2
(45) Date of Patent: Jun. 8, 2021

(54) METHOD FOR VNF MANAGERS PLACEMENT IN LARGE-SCALE AND DISTRIBUTED NFV SYSTEMS

(71) Applicant: TELEFONAKTIEBOLAGET LM ERICSSON (PUBL), Stockholm (SE)

(72) Inventors: Mohammad Abu Lebdeh, Montreal (CA); Diala Naboulsi, Ville Saint Laurent (CA); Roch Glitho, Ville Saint Laurent (CA); Constant Wette Tchouati, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/623,665

(22) PCT Filed: Jul. 12, 2018

(86) PCT No.: PCT/IB2018/055171
§ 371 (c)(1),
(2) Date: Dec. 17, 2019

(87) PCT Pub. No.: WO2019/012485
PCT Pub. Date: Jan. 17, 2019

(65) Prior Publication Data
US 2020/0162323 A1    May 21, 2020

Related U.S. Application Data

(60) Provisional application No. 62/532,706, filed on Jul. 14, 2017.

(51) Int. Cl.
*H04L 12/24* (2006.01)
*G06F 9/455* (2018.01)
(Continued)

(52) U.S. Cl.
CPC ...... *H04L 41/0806* (2013.01); *G06F 9/45558* (2013.01); *H04L 41/0896* (2013.01);
(Continued)

(58) Field of Classification Search
CPC .............. H04L 65/602; H04L 65/4084; H04L 67/2842; H04L 69/14
See application file for complete search history.

(56) References Cited

U.S. PATENT DOCUMENTS

| 2013/0268672 | A1 | 10/2013 | Justafort et al. | |
| 2016/0212016 | A1* | 7/2016 | Vrzic | H04L 45/306 |
| 2017/0192811 | A1* | 7/2017 | Kiess | G06F 9/541 |

FOREIGN PATENT DOCUMENTS

| EP | 2940582 A1 | 11/2015 |
| WO | 2015131696 A1 | 9/2015 |
| WO | 2017137061 A1 | 8/2017 |

OTHER PUBLICATIONS

Verma, Akshat & Ahuja, Puneet & Neogi, Anindya. (2008). pMapper: Power and Migration Cost Aware Application Placement in Virtualized Systems. Middleware. 5346. 243-264. 10.1007/978-3-540-89856-6_13. (Year: 2008).*

(Continued)

*Primary Examiner* — John M Macilwinen

(57) ABSTRACT

There is provided a network node and method for placement of virtual network functions managers (VNFMs) in a network functions virtualization (NFV) system. The method comprises determining a number of VNFMs for the NFV system, determining a type for each VNFM, determining a placement for each VNFM over distributed Network Function Virtualization Infrastructure Points of Presence (NFVI-PoPs) and determining a plurality of associations between the VNFMs and VNF instances in the system, thereby generating a VNFMs placement solution.

10 Claims, 18 Drawing Sheets

(51) Int. Cl.
H04L 12/26 (2006.01)
H04L 29/08 (2006.01)
(52) U.S. Cl.
CPC .......... *H04L 41/12* (2013.01); *H04L 43/0852* (2013.01); *H04L 67/10* (2013.01); *G06F 2009/45595* (2013.01)

(56) References Cited

OTHER PUBLICATIONS

M. Ghaznavi, A. Khan, N. Shahriar, K. Alsubhi, R. Ahmed and R. Boutaba, "Elastic virtual network function placement," 2015 IEEE 4th International Conference on Cloud Networking (CloudNet), Niagara Falls, ON, 2015, pp. 255-260, doi: 10.1109/CloudNet.2015.7335318. (Year: 2015).*

Mijumbi, Rashid. Placement and Scheduling of Functions in Network Function Virtualization. pp. 1-14. (Year: 2014).*

Aakarshan Singh et.al. Network Function Virtualisation. Int. Journal of Engineering Research and Application. ISSN : 2248-9622, vol. 7, Issue 4, ( Part-6) Apr. 2017, pp. 85-95 (Year: 2017).*

B. Han, V. Gopalakrishnan, L. Ji and S. Lee, "Network function virtualization: Challenges and opportunities for innovations," in IEEE Communications Magazine, vol. 53, No. 2, pp. 90-97, Feb. 2015, doi: 10.1109/MCOM.2015.7045396. (Year: 2015).*

A. Boloori Arabani et al., Facility location dynamics: An overview of classifications and applications, Elsevier, Computers & Industrial Engineering 62 (2012), pp. 408-420.

A. Sallahi et al., Expansion Model for the Controller Placement Problem in Software Defined Networks, IEEE Communications Letters, vol. 21, No. 2, Feb. 2017, 4 pages.

Draft ETSI GS IFA 010 V0.8.1, Network Functions Virtualisation (NFV) Management and Orchestration Functional Requirements Specification, Jan. 2016, 58 pages.

ETSI GS NFV 002 V1.2.1 (Dec. 2014), Network Functions Virtualisation (NFV); Architectural Framework, 21 pages.

ETSI GS NFV-IFA 009 V1.1.1 (Jul. 2016), Network Functions Virtualisation (NFV); Management and Orchestration; Report on Architectural Options, 31 pages.

ETSI GS NFV-MAN 001 V1.1.1, "Network Functions Virtualisation (NFV); Management and Orchestration", Dec. 2014, 184 pages.

F. J. Ros et al., On reliable controller placements in Software-Defined Networks, Elsevier, Computer Communications 77 (2016), pp. 41-51.

J. G. Herrera et al., Resource Allocation in NFV: A Comprehensive Survey, IEEE Transactions on Network and Service Management, vol. 13, No. 3, Sep. 2016, 15 pages.

Md T I UL Huque et al., Large-Scale Dynamic Controller Placement, IEEE Transactions on Network and Service Management, vol. 14, No. 1, Mar. 2017, 14 pages.

Md. F. Bari et al., Dynamic Controller Provisioning in Software Defined Networks, ISBN 978-3-901882-53-1, 9th CNSM and Workshops © 2013 IFIP, 8 pages.

N. Mladenovic et al., The p-median problem: A survey of metaheuristic approaches, Elsevier, European Journal of Operational Research 179 (2007), pp. 927-939.

R. Zanjirani Farahani et al., Facility Location, Concepts, Models, Algorithms and Case Studies, Physica-Verlag, A Springer Company, Springer-Verlag Berlin Heidelberg 2009, corrected publication 2020, 547 pages.

S. Basu et al., Metaheuristic applications on discrete facility location problems: a survey, Springer, OPSEARCH (Jul.-Sep. 2015) 52(3), pp. 530-561.

S. Lange et al., Heuristic Approaches to the Controller Placement Problem in Large Scale SDN Networks, IEEE Transactions on Network and Service Management, vol. 12, No. 1, Mar. 2015, 14 pages.

ISR and Written Opinion from corresponding application PCT/IB2018/055171.

* cited by examiner

METHOD FOR VNF MANAGERS PLACEMENT IN LARGE-SCALE AND DISTRIBUTED NFV SYSTEMS

PRIORITY STATEMENT UNDER 35 U.S.C. S.119(E) & 37 C.F.R. S.1.78

This non-provisional patent application claims priority based upon the prior U.S. provisional patent application entitled "A Method for VNF Managers Placement in Large-Scale and Distributed NFV Systems", application No. 62/532,706, filed Jul. 14, 2017, in the name of ABU LEBDEH et al.

TECHNICAL FIELD

The present disclosure relates to Network Function Virtualization (NFV).

BACKGROUND

Network Function Virtualization (NFV) has emerged as a new approach for designing, deploying and managing network infrastructure. It decouples network functions (e.g. firewall) from proprietary hardware and runs them as software applications on general purpose hardware. This shift in paradigm toward "softwarization" allows cost reduction and service agility.

The European Telecommunications Standards Institute (ETSI) is leading the standardization effort for NFV. It defines the NFV architectural framework 100 as depicted in FIG. 1. It encompasses Virtualized Network Functions (VNFs) 102, NFV Infrastructure (NFVI) 104 and NFV Management and Orchestration (MANO) 106 framework. VNFs 102 are the software implementation of the network functions. A VNF can be implemented as one or more of software components, termed as VNF Components (VNFCs). NFVI 104 is the environment in which VNFs are deployed. It is a combination of hardware and software resources that might span several geographically distributed locations called NFVI Point of Presences (NFVI-PoPs). The NFV MANO framework enables the automated management of the resources, VNFs and network services, while guaranteeing that the operators' requirements, e.g. performance and reliability, are met. The NFV MANO framework includes three functional blocks: NFV Orchestrator (NFVO) 108, VNF Manager (VNFM) 110 and the Virtual Infrastructure Manager (VIM) 112. The NFVO 108 is responsible for the orchestration of the NFVI resources and the lifecycle management of the network services. Lifecycle management refers to the functions needed to manage the instantiation, maintenance (e.g. scaling, healing and monitoring) and termination of a network service or a VNF. Further, the VNFM 110 manages the lifecycle of VNF instances of the same or different types. As such, each VNF is associated to a VNFM. A single or multiple VNFMs can be used to serve all VNF instances. The VIM 112 is responsible for managing and controlling compute, storage and network resources. The MANO functional blocks communicate with each other, and with other functional blocks (e.g. VNF) through a set of well-defined reference points.

More details concerning the different components are provided in the following paragraphs.

1) VIM 112: The VIM manages and controls the NFVI compute, storage and network resources, usually within one operator's domain. In MANO, the NFVO and VNFM are the consumers for VIM services. For instance, the VIM performs resource allocation and de-allocation on their behalf. It also collects and reports resources fault and performance information. The NFVI resources can be managed by one or more of VIMs. Each VIM can manage a subset of resources within an NFVI-PoP, all resources within an NFVI-PoP, or the resources across multiple NFVI-POPs.

2) VNFM 110: The VNFM is responsible for managing the lifecycle of one or more of VNF instances. As such, each VNF is associated to a VNFM. The VNFM can collect the virtualized resource performance information from the VIM, and the VNF indicators from the Element Manager (EM) or VNF instance. An indicator is an application-level information that provides insight into the VNF behavior. The VNFM uses the collected information for decision making, such as VNF auto-scaling. Furthermore, a VNFM can be either generic or VNF-specific. A generic VNFM can manage VNF instances of different types that might be provided by different VNF providers. A VNF-specific VNFM has a dependency on the VNFs and can manage VNF instances of defined type(s), usually provided by the VNF provider. The MANO framework has no restrictions on the number of VNFMs in a domain. The operator might use one or more of VNFMs to manage the VNF instances.

3) NFVO 108: Two main tasks are delegated to the NFVO. First, it orchestrates the NFVI resources across multiple VIMs. The NFVO's role involves, but is not limited to, resource request authorization and capacity management. Second, it manages the lifecycle of the network services which involves the coordination with VNFMs in managing the VNFs lifecycle. For instance, the NFVO and VNFMs work jointly to ensure that the VNF instances meet the desired requirements (e.g. performance and reliability). The NFVO can collect the VNF indicators information and virtualized resource performance metrics from VNFMs. It analyses this information to assure that the network services satisfy their requirements.

The MANO functional blocks communicate with other non-MANO functional blocks. Among them is the Element Management (EM) which is responsible for FCAPS (Fault, Configuration, Accounting, Performance, and Security) management functionality for one or more of VNF instances. It has overlapping functions with the VNFM. However, the key difference between them is that the EM manages a VNF instance through a proprietary reference point, whereas the VNFM uses a standard reference point. In that context, the EM can play the role of proxy by exposing the VNF management functions to VNFM through a standard reference point. The EM might exist in the system in various forms, such as VNFC in the VNF itself.

The MANO blocks communicate together as well as with the non-MANO functional blocks through a set of reference points as indicated in FIG. 1. ETSI specifications define the interfaces, operations and information model supported by the reference points. However, the details of the operations and the communication protocols are not discussed. The following reference points are relevant to the present description: Or-Vnfm: a reference point between the NFVO and a VNFM, Or-Vi: a reference point between the NFVO and a VIM, Vi-Vnfm: a reference point between a VNFM and a VIM, Ve-Vnfm: a reference point between a VNFM and an EM/VNF instance.

In large-scale and distributed NFV deployments, these management functions face critical challenges such as delays, and variations in VNFs workload. Placing NFVO and NFVM in a large scale distributed NFV deployment is therefore a very challenging problem due to constant variations of the network topology and the potential negative impact on performance and operational cost. VNFM placement such that operational cost is minimized without violating performance requirements is called the VNFM Placement Problem (MPP) herein. There is a need to solve the VNFM Placement Problem.

SUMMARY

There is provided a method for placement of virtual network functions managers (VNFMs) in a network functions virtualization (NFV) system. The method comprises determining a number of VNFMs for the NFV system; determining a type for each VNFM; determining a placement for each VNFM over distributed Network Function Virtualization Infrastructure Points of Presence (NFVI-PoPs); and determining a plurality of associations between the VNFMs and VNF instances in the system, thereby generating a VNFMs placement solution. The method may further comprise setting a current VNFMs placement solution to the VNFMs placement solution. The method may further comprise placing the VNFMs on the NFVI-PoPs, assigning the VNF instances to the VNFMs according to the current VNFMs placement solution and activating the VNFMs. The method may further comprise generating a set of neighbor VNFMs placement solutions, determining a best VNFMs placement solution among the current VNFMs placement solution and the set of VNFMs placement solutions and setting the current VNFMs placement solution to the best VNFMs placement solution.

Determining the best VNFMs placement solution may be executed iteratively until a termination criterion is satisfied. Generating the set of neighbor VNFMs placement solutions may comprise randomly selecting a VNF currently assigned to a first active VNFM; assigning the VNF to a second VNFM of a same type; activating the second VNFM, if the second VNFM is inactive; and deactivating the first active VNFM, if there are no associations between the first active VNFM and other VNF instances.

Alternatively, generating the set of neighbor VNFMs placement solutions may comprise randomly selecting an active VNFM with a placement on a first NFVI-PoP; randomly selecting a second NFVI-PoP, different from the first NFVI-PoP; and relocating the randomly selected active VNFM to the randomly selected second NFVI-PoP.

Alternatively, generating the set of neighbor VNFMs placement solutions may comprise randomly selecting an active VNFM; upon determining that other active VNFM of a same type have enough capacity to manage VNFs assigned to the randomly selected active VNFM while satisfying delay constraints, reassigning each VNF assigned to the selected active VNFM to any one of the other active VNFM that has enough capacity to manage the VNF; and deactivating the randomly selected active VNFM.

Alternatively, generating the set of neighbor VNFMs placement solutions may comprise randomly selecting a first active VNFM; randomly selecting a second active VNFM, different from the first active VNFM; finding an intersection of respective first and second subsets of NFVI-PoPs where the first and the second active VNFMs can be placed while satisfying respective delay constraints for all VNF instances assigned to the first and the second active VNFMs; reassigning all VNFs assigned to the second active VNFM to the first active VNFM if the intersection of the respective first and second subsets of NFVI-PoPs is not empty and if the first active VNFM has enough capacity to manage the VNFs and deactivating the second active VNFM; and relocating the first active VNFM to another NFVI-PoP randomly selected from intersection of respective first and second subsets of NFVI-PoPs if the NFVI-PoP where the first active VNFM is located doesn't belong to the intersection of respective first and second subsets of NFVI-PoPs.

Determining the best VNFMs placement solution may comprise selecting the VNFMs placement solution which minimizes operational cost which is the sum of a VNFM resource cost, a VNFs lifecycle management cost over time period, a VNFM migration cost and a VNFs reassignment cost, a penalty value proportional to a level of violation of system constraints generated by the neighbor solution, and a sum of delays between active VNFMs and associated VNF instances for the neighbor solution.

There is provided a network node operative to execute placement of virtual network functions managers (VNFMs) in a network functions virtualization (NFV) system. The network node comprises processing circuits and a memory, the memory containing instructions executable by the processing circuits. The network node is operative to determine a number of VNFMs for the NFV system; determine a type for each VNFM; determine a placement for each VNFM over distributed Network Function Virtualization Infrastructure Points of Presence (NFVI-PoPs); and determine a plurality of associations between the VNFMs and VNF instances in the system, thereby generating a VNFMs placement solution.

The network node may further be operative to execute any one of the steps of the method described above.

There is provided a non-transitory computer readable media having stored thereon instructions for placement of virtual network functions managers (VNFMs) in a network functions virtualization (NFV) system. The instructions comprise determining a number of VNFMs for the NFV system; determining a type for each VNFM; determining a placement for each VNFM over distributed Network Function Virtualization Infrastructure Points of Presence (NFVI-PoPs); and determining a plurality of associations between the VNFMs and VNF instances in the system, thereby generating a VNFMs placement solution.

DETAILED DESCRIPTION

Figure 1:
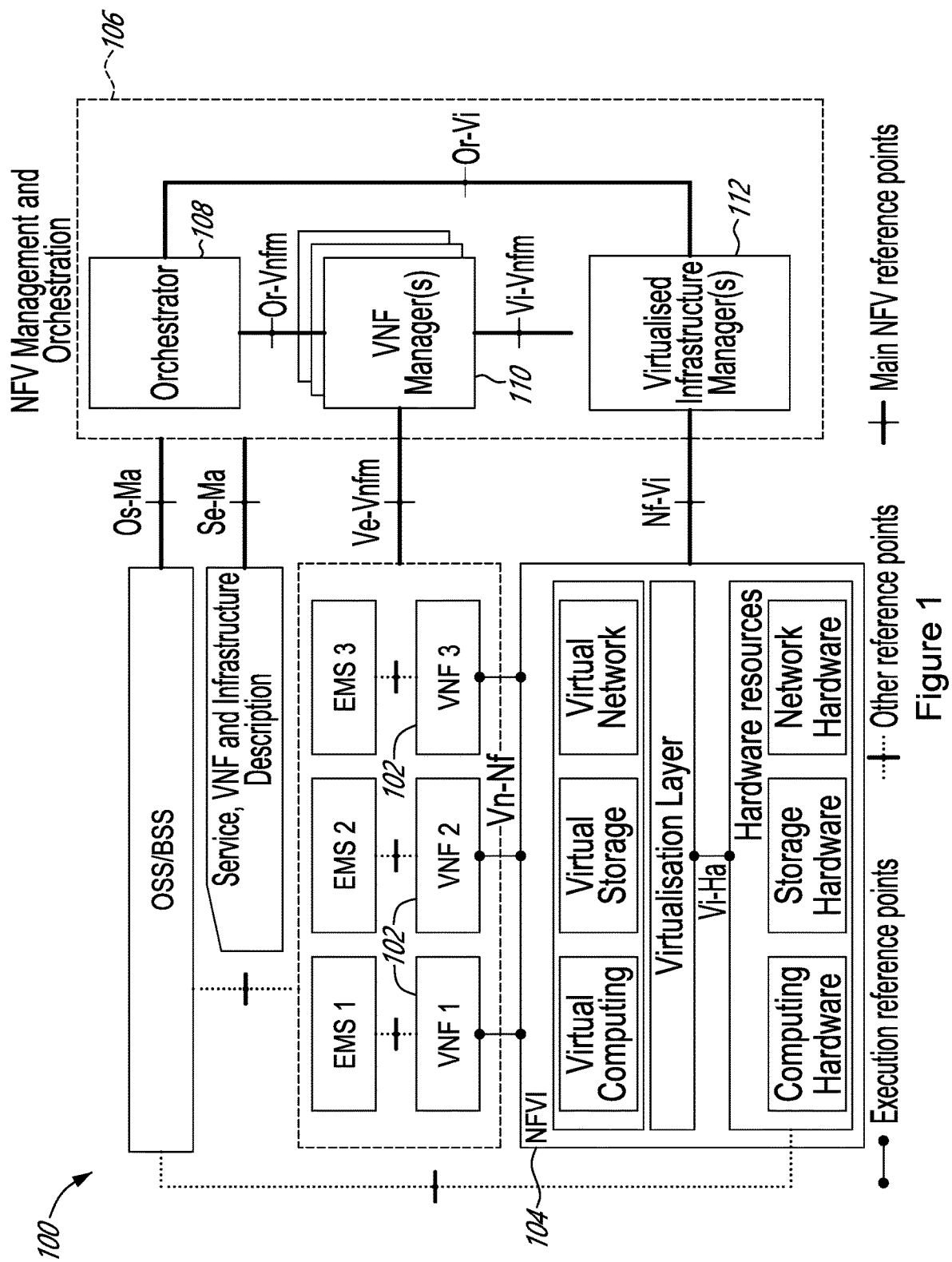
FIG. 1 is a schematic illustration of the ETSI NFV architectural framework.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa.

Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Resource Placement in NFV

Resource placement in NFV environments has received significant attention over the last few years. The problem of placing VNFs has been extensively studied and there, the idea is to optimize the placement of chains of VNFs, over commodity servers in the system, by reserving resources as needed. In particular, the VNFs placement problem takes as an input a set of VNF Forwarding Graphs (VNF-FG), where each VNF-FG is a representation of interconnections among VNFs of the same chain and their needed resources. In each VNF-FG, VNFs of the same chain are represented by nodes. Each couple of consecutive VNFs in the chain is linked with a directed edge that is weighted by the bandwidth required for communication between them. Given these VNF-FGs, the VNF placement algorithm derives placement configuration for VNFs according to a predefined objective.

A variety of objectives has been covered in the literature, including minimizing the number of used nodes, enabling efficient resource utilization in the system, minimizing the length of paths traversed by flows, minimizing communication cost and minimizing global operational cost as well as covering setup and network traffic costs. The literature further studied trade-offs among different optimization objectives including maximizing the data rate, minimizing the number of used nodes and minimizing the latency. While significant effort has been put to study VNF placement problem in the NFV community, the problem of VNFM placement has not received any attention so far.

The problem of VNFM placement differs from VNF placement problem and needs to be studied per se. In the ETSI NFV architecture, the VNFs reside in the data plane whereas the VNFMs belong to the management plane. Hence, the VNF placement problem allows optimizing VNF flows handling at the data plane level. Instead, the VNFM placement problem targets optimization at the management plane. As a result, different functional blocks and requirements are implied in each problem, translating into distinct problem formulations. When it comes to the functional blocks, in VNF placement problem, led over the data plane level, the VNFs are the functional blocks involved, aiming at serving requests. Conversely, in the VNFM placement problem, operating at management level, various functional blocks are involved. These include the placed VNFs, Element Managers (EMs), VIMs and the NFVO.

When it comes to the differences in requirements, an example is the latency. In the case of the VNF placement problem, an overall service latency level is usually imposed. Whereas, for the VNFM placement problem, each reference point can be bound by a latency limit. The latter depends on the VNF instance. As an example, for one specific VNF instance, the reference point Or-Vnfm can be bound by a latency limit that differs from that of the reference point Ve-Vnfm. Eventually, this translates into differences in the constraints in the two problems.

In addition, the communication patterns in the two problems are quite different. VNF placement, solely led over the data plane level, generally accounts for intra-data plane communication, i.e. communication among VNFs and disregards any communication towards other functional blocks in the system. Instead, in the VNFM placement problem, operating at the management level, communication among various involved functional blocks in the system needs to be covered. In particular, communications between VNFM on the one hand, with placed VNFs, EMs, VIMs and the NFVO need to be considered. This adds to the complexity of modelling the network traffic over communication links with respect to VNF placement. Also, differences in requirements translate into differences in needed resources. Corresponding costs in the two problems can significantly differ as well. For example, the needed computational resources for one VNF differ from those needed to operate a VNFM.

Resource Placement in Software Defined Network (SDN)

Similar to the problem of VNFM placement, in the area of SDN, is the problem of placing controllers. The problem has attracted significant research efforts there. The idea is to determine the number and placement of controllers needed in the network to control the set of deployed switches. A variety of objectives has been targeted, including minimizing the latency in the system, considering the overall operational cost and studying trade-offs that exist among a variety of metrics including latency, resilience and load balancing.

Still, the problem of SDN controllers placement differs from the problem of VNFM placement as follows. A first difference is in the scale. In the SDN placement problem, decisions are linked to a smaller number of switches, i.e. typically tens of switches, while in the problem of VNFM placement, the number of VNFs may go up to thousands. A second difference is the variability. For SDN controllers placement, additional switches are placed in particular events that do not occur frequently, e.g. network expansion. Instead, in the problem of VNFM placement, VNFMs placement decisions are linked to the number of VNFs in the system that can encounter significant changes even throughout a single day, e.g. over a day and night hours. A third difference is that controllers in an SDN environments are not controlled by a centralized entity, while VNFMs are all linked to an NFVO, imposing additional constraints in the problem formulations. Finally, requirements in the two problems differ, translating into differences in constraints and objectives formulations. For instance, as an SDN controller and VNFM fulfill different functionalities and the costs for activating them are not the same.

Facility Location Problem (FLP) in Operations Research

From an operations research perspective, the problem of VNFM placement is similar to the dynamic facility location problem (DFLP), where the objective is to plan the placement of facilities over a future time period dynamically, according to changes in the system. However, DFLP assumes complete knowledge of the arrival of upcoming changes in the system, which is not feasible in the case of VNFM placement. VNFM placement instead operates over a set of snapshots, where each snapshot is a representation of the network state over a significant period of time. Over one snapshot, it is possible to map the VNFM placement problem to a Facility Location Problem (FLP). The FLP problem has received significant attention in the operations research community. Exact, approximation and heuristic algorithms have been employed in order to solve FLP. However, FLP problems are known to be NP-hard. As a result, in large-scale scenarios deriving optimal solutions becomes unfeasible and mainly heuristic and meta-heuristic algorithms have been designed. While heuristics are typically tightly linked to the specific problem context, meta-heuristics rely on general techniques that can be employed in different scenarios. There, a variety of techniques have been covered, including simulated annealing, genetic algorithm and tabu search algorithm. In the existence of a variety of meta-heuristics, selecting one to build upon is not a simple task. However, previous studies comparing the performance of the various meta-heuristic techniques have underlined the fact that genetic algorithms and tabu search techniques provide superior results with respect to others for several instances of the FLP problem. The tabu search technique can therefore be relied upon in order to design a new dynamic algorithm that allows adapting the placement of management functional blocks to the changes occurring in the system.

While offering promising capabilities, NFV still poses significant challenges for operators. In particular, the possibility of instantiating and elastically scaling network services and network functions on-demand, introduces an additional level of dynamics in the system that needs to be handled properly, especially in large-scale and distributed NFV systems. In this context, the placement of the NFVO and VNFMs play a critical role when it comes to the system's performance, reliability, scalability and operational cost. In particular, communication among MANO functional blocks and other functional blocks takes place over WAN links. This can introduce communication delay, which is not necessarily the same between different locations. The delay might change due to dynamic changes in network conditions. The communication overhead over links with high delay degrades the performance of management functions sensitive to delay. For instance, the communication overhead and delay may prevent the frequent collection and analysis of monitoring data (e.g. performance information) from the environment (e.g. VNF instances and VIMs).

Another example is the VNF fault management. A fast failure notification and recovery are necessary to minimize the impact of the failure and maintain the network services' reliability. In an NFV environment, applications are constantly updated and small changes are rolled out continuously. The deployment is part of the applications development workflow and the placement of VNFMs have a direct impact on the deployment time. Moreover, the resource cost might differ from one location to another for various reasons, such as the energy cost or the NFVI resources cost from multiple providers (NFVI as-a-Service).

Seen from standardization perspective, a single NFVO exists in a domain, whereas when it comes to VNFMs, there are many possibilities: (1) one VNFM is used for each VNF instance, (2) a single VNFM serves all VNF instances in the system, and (3) multiple VNFMs are used to manage all VNF instances. In a large-scale deployment, the first scenario is impractical. On the one hand, it increases the complexity of the NFV management, since the NFVO should interact with thousands of VNFMs. On the other hand, it leads to a high operational cost. The second scenario suffers from scalability issue; a single VNFM usually has a limited resource capacity and hence cannot serve a large number of VNF instances. The third scenario offers a trade-off between the two other options instead. More importantly, it offers the possibility to adapt the number and placement of VNFMs in the system according to changes occurring there. Nevertheless, this scenario also poses the challenge of determining the required number and placement of the VNFMs in the system.

To this extent, the placement of the NFVO and VNFMs is indeed an important problem to address since it might have a negative impact on performance and operational cost.

Certain aspects of the present disclosure and their embodiments may provide solutions to these or other challenges.

There is proposed a new method for optimal placement of VNFMs dynamically in the context of large-scale and distributed NFV systems. More precisely, over a snapshot, the placement of the NFVO and a set of VNF instances over a set of geographically distributed NFVI-PoPs is given. Then, an objective is to identify the optimal number and placement of the VNFMs from an operational cost perspective. It is believed that this problem was never addressed before. The problem of online VNF Managers Placement Problem (MPP) is introduced. A general Integer Linear Programming (ILP) formulation of the problem is proposed. This modelling allows determining the number and placement of VNFMs at minimum overall management cost for operators. The details of the ILP model are described. The model takes into account operational constraints such as maximum delay and capacity limit of computing resources. The model is implemented in IBM ILOG CPLEX Optimizer, which allows to find optimal solutions for small-scale instances.

There is proposed a method to optimize the placement of VNFMs in a large-scale distributed network and dynamically adapt the NFV MANO architecture at each snapshot to changes in the network topology and variations in VNF instances in number, type or location. A snapshot is a representation of the network state over a significant period of time is used. A significant period of time can be, for example, one or more hours, but other longer periods such as some days or shorter periods in the range of minutes could also be envisioned. An implementation of the method based on tabu search to solve the MPP problem in a large-scale distributed network in both static and dynamic schemes is proposed. Tabu search is an efficient neighborhood search method that uses adaptive memory. The steps were carefully designed, in the light of the peculiarities of the problem of VNFM placement. A method that scales the management capacity elastically to adapt to the workload changes is also proposed, thus making sure there are always enough VNFMs managers to handle a growing amount of VNFs both in size and geographically.

The performance of the tabu search was assessed over a realistic dataset. Its solution is compared to the optimal one derived based on the ILP model. Its results is also compared to those obtained based on a greedy approach. The small— and large—scale evaluations confirm that the tabu search allows deriving high-quality solutions in a very short time.

The impact of key aspects, i.e. NFVO location and objective function weight, on the outcome of the problem was also studied. These aspects can have a notable impact on the placement decisions and require adequate tuning according to the operator's requirements.

Doing that, it is shown that the NFVO location and objective function weight can have a notable impact on the placement decisions and require adequate tuning according to the operator's requirements.

There are, proposed herein, various embodiments which address one or more of the issues disclosed herein.

Certain embodiments may provide one or more of the following technical advantage(s):

The method determines the optimal number of VNFMs and their placement at each snapshot, to dynamically adapt the NFV MANO architecture to changes in the network topology due to variations in the number of VNF instances or their locations. The architecture adaptation reduces the communication overhead, which is especially important for frequently executed operations.

The method automatically scales the VNFMs management capacity elastically to adapt to changes in VNFs workload in three dimensions: size, type and geolocation; and to meet the desired performance requirements.

As deployment becomes part of the applications development cycle in DevOps workflow, an optimal placement of VNFMs will speed up not only the deployment time, but the whole VNFs DevOps Lifecycle.

The method takes into account the constraints on facilities cost in the selection of a VNFM location. This cost might differ from one location to another for various reasons, such as the energy cost or the NFVI resources cost as provided by multiple providers (NFVI as-a-Service).

MMP Problem Description

In order to solve the MMP problem, it is proposed to find (1) the optimal number of VNFMs in an NFV system, (2) their type (e.g. generic VNFM and VNFM for managing specific VNFs), (3) the placement of VNFMs over distributed NFVI-PoPs, and (4) the associations they hold with VNF instances, given the location of the VNF instances and a fixed location of the NFVO.

It is an aim to do so at a minimum operational cost, while satisfying communication delay and capacity constraints (e.g. links and VNFM) in the system.

The design of ETSI NFV framework allows a plurality of implementation and deployment models to emerge. Therefore, for the purpose of simplification and not for limitation, the following four assumptions are made: (1) the NFVO and VNFMs are implemented as distinct components, (2) The VNF instance and its EM are deployed at the same NFVI-PoP, (3) a VIM manages the resources within one NFVI-PoP, and (4) the communication between various functional blocks happen through the same links as regular traffic, and not through dedicated links. In this context, for instance, the same link is used in the communication between the VNFM and the VIM(s) of an NFVI-PoP as well as the VNF instances deployed on it. Next, the mathematical representation of the system is described, followed by the problem formulation.

System Model

In MPP, operations are over a set of snapshots. A snapshot t is defined as a representation of the system state over a fixed-time interval. In the following, a system model covering different entities in the system, as well as the network traffic is presented.

1) NFVI: the NFVI is represented using an undirected graph structure G=(P,E). There, P is a set of nodes, with each node p representing an NFVI-PoP and E is a set of edges linking them.

An edge $(p,q) \in E$ linking a couple of NFVI-PoPs p and q represents a logical communication link between them. $\gamma_{p,q}$ and $\delta_{p,q}(t)$ are employed to represent capacity and delay over snapshot t of edge $(p,q) \in E$, respectively. $c_p^{com}(t)$ and $c_{p,q}^{net}(t)$ are used to denote the cost of one unit of compute resource at $p \in P$ and one unit of network bandwidth over the edge $(p,q) \in E$, respectively.

2) NFVO: it is assumed that the NFVO is deployed at a given NFVI-PoP. $h_p \in \{0,1\}$ is used to refer to its location, such that $h_p$ is equal to 1 if the NFVO is placed at $p \in P$, and 0 otherwise.

3) VNFM: M(t) is defined as the set of VNFMs m that can be used over snapshot t. It is considered that different types of VNFMs exist and K is defined as the set of VNFM types. $n_k$ denotes the capacity of a VNFM m of type $k \in K$. It represents the maximum number of VNF instances that can be managed by a VNFM. $M_k(t) \in M(t)$ is defined as the set of VNFMs of type $k \in K$ that can be used over snapshot t. $\hat{M}_k(t)$ represents the set of VNFMs of type $k \in K$, selected from $M_k(t)$ to be used over snapshot t. Further, it is assumed that the NFVO can relocate a VNFM from one NFVI-PoP to another one. $g_{m,k}$ is used to refer to the bandwidth consumed in migrating VNFM m of type k, from one NFVI-PoP to another. The cost of migrating a VNFM m of type k∈K is denoted by $c_{m,k}^{mig}(t)$; it represents a penalty for the service disruption caused by the migration.

4) VNF: V(t) is the set of VNF instances v deployed at time t. $V_k(t)$ is a subset of V(t) that includes all VNF instances that require VNFM of type k∈K to manage them. $l_{v,p}(t) \in \{0,1\}$ is used to identify the location of a VNF instance, such that $l_{v,p}(t)$ is equal to 1 if the VNF instance v is placed at p∈P over snapshot t, otherwise 0. Further, the communication overhead, introduced in managing lifecycle of a VNF instance v, is controlled through two thresholds.

The first is $\varphi_v(t)$ which represents the maximum permissible delay between the VNF instance v and the VNFM managing it over snapshot t. The second is $\omega_v(t)$ and refers to the maximum permissible delay between the NFVO and the VNFM managing the VNF instance v over snapshot t.

Figure 2:
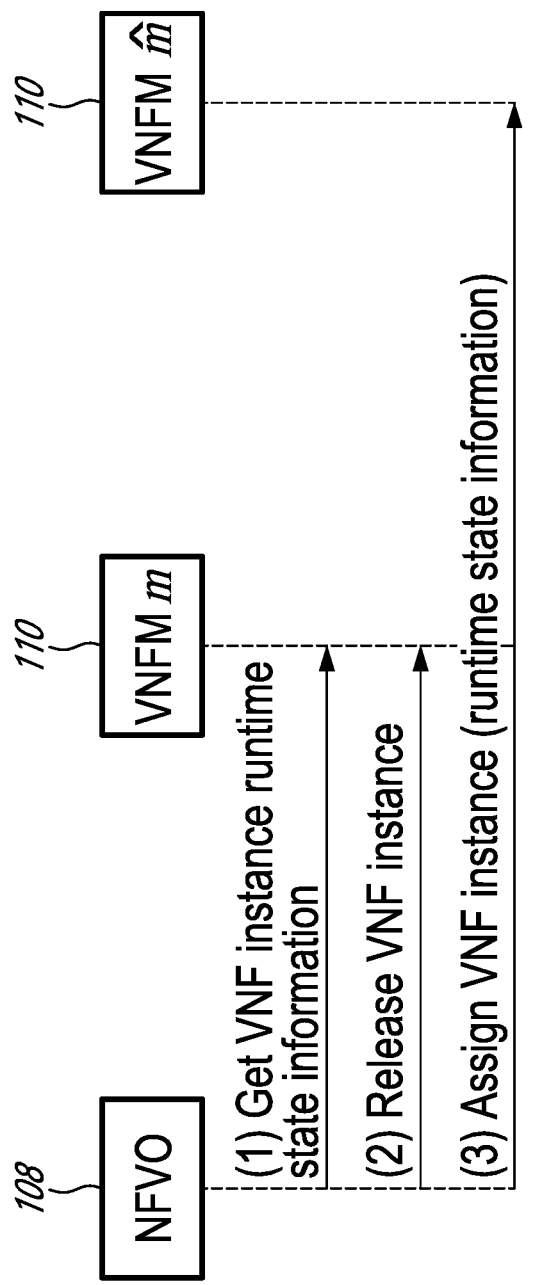
FIG. 2 is a flow diagram illustrating signaling messages carried out through a procedure in which the NFVO transfers management responsibility of a VNF instance from a currently assigned VNFM to another one in accordance with some embodiments.

It is assumed the NFVO can transfer the management responsibility of a VNF instance v from currently assigned VNFM to another one. FIG. 2 shows the flow of signaling messages carried out through this procedure. In step (1), the NFVO retrieves the runtime state information (e.g. IP address, port and security information) of the VNF instance v from its associated VNFM, for instance VNFM m. Then in step (2), it relieves the VNFM m from its responsibilities. Finally, in step (3), the NFVO assigns the VNF instance to VNFM m̂ and provides it with the information needed to take over the management of the VNF instance v. To that extent, $s_v$ and $\hat{s}_v$ are used to denote the bandwidth consumed by the signaling messages used in the deassignment (steps 1 and 2) and assignement (step 3) of VNF instance v. It is assumed that $c_v^{rea}(t)$ refers to the reassignment cost of a VNF instance v; it represents the penalty paid for reconfiguring the system to ensure its stability.

5) Network Traffic: MANO functional blocks interact with each other and with other non-MANO functional blocks (e.g. EM) to manage the lifecycle of the VNF instances. Herein, for a VNF instance v, it is assumed that $u_v^{O,M}(t)$, $u_v^{O,I}(t)$, $u_v^{M,I}(t)$, $u_v^{M,V}(t)$ represent the units of bandwidth to be consumed during the communication between the NFVO and a VNFM, the NFVO and a VIM, a VNFM and a VIM, a VNFM and a EM/VNF instance v over reference points Or-Vnfm, Or-Vi, Vi-Vnfm and Ve-Vnfm, respectively, at snapshot t.

Problem Formulation

The MPP is formulated as an ILP problem, where the aim is at deriving decisions over individual snapshots. More precisely, given two consecutive snapshots (t−1) and t, at the end of snapshot t−1, the problem to decide the VNFMs placement along with the associations they hold with the VNF instances over snapshot t is solved. The placement decisions made for all VNFMs in M(t) allow determining whether to instantiate new VNFMs, as well as to maintain, terminate, or relocate existing VNFMs. M(t) is defined as follows:

$$M_k(t) = F_k(t) \cup \hat{M}_k(t-1)$$

where Fk(t) is a set of new VNFMs m of type k that can be instantiated in the system over snapshot t, such that:

$$|F_k(t)| = \sum_{p \in P} \left\lceil \frac{\sum_{v \in V_k(t)} l_{v,p}(t)}{n_k} \right\rceil$$

By that, $|F_k(t)|$ represents an upper bound on the number of VNFMs m of type k that need to be instantiated in the system over snapshot t.

The decision variables are the following:

$$x_{m,k,p}(t) = \begin{cases} 1 & \text{if } VNFM \ m \in M_k(t) \text{ is placed at } p \in P, \\ 0 & \text{otherwise.} \end{cases} \quad (1)$$

$$y_{v,m,k,p}(t) = \begin{cases} 1 & \text{if } VNF \ v \in V_k(t) \text{ is assigned to} \\ & m \in M_k(t) \text{ that is placed at } p \in P, \\ 0 & \text{otherwise.} \end{cases} \quad (2)$$

Operational Cost: Four different cost components contribute to the definition of the operational cost, defined as follows:

1) Lifecycle Management Cost ($C^{lif}(t)$): The lifecycle management cost represents the cost of the network bandwidth consumed in the communication performed through the lifecycle management of all VNF instances in the system over snapshot t:

$$c^{lif}(t) = \sum_{(p,q) \in E} (\mathcal{B}^{lif}(p,q) + \mathcal{B}^{lif}(q,p)) c_{p,q}^{net}(t) \quad (3)$$

where $$\mathcal{B}^{lif}(p,q) = \sum_{k \in K} \sum_{v \in V_k(t)} \sum_{m \in M_k(t)} y_{v,m,k,q}(t) l_{v,p}(t) (u_v^{M,V}(t) + u_v^{M,I}(t)) + $$
$$y_{v,m,k,p}(t) h_q u_v^{O,M}(t) + l_{v,p}(t) h_q u_v^{O,I}(t)$$

2) Compute Resources Cost ($C^{com}(t)$): The compute resources cost represents the cost of compute resources assigned to VNFMs over snapshot t:

$$C^{com}(t) = \sum_{k \in K} \sum_{m \in M_k(t)} \sum_{p \in P} x_{m,k,p}(t) c_p^{com}(t) \quad (4)$$

3) Migration Cost ($C^{mig}(t)$): It represents the cost implied by migrating a VNFM from one NFVI-PoP to another, while switching from snapshot (t−1) to snapshot t. It concerns only the VNFMs that were placed over snapshot (t−1), i.e. in $\hat{M}_k(t-1)$:

$$c^{mig}(t) = \sum_{k \in K} \sum_{\substack{m \in \\ \hat{M}_k(t-1)}} \sum_{(p,q) \in E} x_{m,k,p}(t) x_{m,k,q}(t-1) c_{m,k}^{mig}(t) \quad (5)$$

4) Reassignment Cost($C^{rea}(t)$): While switching from snapshot (t−1) to snapshot t, VNF instances that remain in the system may be reassigned to new VNFMs. Herein, the cost of reassigning these VNF instances is computed as follows:

$$C^{rea}(t) = \qquad (6)$$
$$\sum_{k \in K} \sum_{v \in V_k(t) \cap V_k(t-1)} \sum_{m \in M_k(t)} \sum_{p \in P} y_{v,m,k,p}(t) \left(1 - \sum_{q \in P} z_{v,m,k,q}(t)\right) c_v^{rea}(t)$$

where $$z_{v,m,k,p}(t) = \begin{cases} y_{v,m,k,p}(t-l) & \text{if } VNF \ v \in V_k(t) \cap V_k(t-1) \\ & \text{and } m \in \hat{M}_k(t-1), \\ 0 & \text{otherwise.} \end{cases}$$

The objective of the optimization problem is to minimize the weighted sum of the aforementioned four costs and can be expressed as follows:

$$\text{Min } \varepsilon C^{lif}(t) + \theta C^{com}(t) + \mu C^{rea}(t) + \rho C^{mig}(t) \quad (7)$$

Constraints: Each VNF instance should be assigned to one VNFM, as indicated in constraint (8):

$$\sum_{m \in M_k(t)} \sum_{p \in P} y_{v,m,k,p}(t) = 1, \forall k \in K, v \in V_k(t) \quad (8)$$

Equation (9) stipulates that a VNF instance cannot be assigned to a VNFM at NFVI-PoP p, unless that VNFM is placed at that location:

$$y_{v,m,k,p}(t) \leq x_{m,k,p}(t), \forall k \in K, v \in V_k(t), m \in M_k(t), p \in P \quad (9)$$

In constraint (10), it is ensured that the number of VNF instances assigned to each VNFM does not exceed its capacity:

$$\sum_{p \in V_k(t)} y_{v,m,k,p}(t) \leq n_k, \forall k \in K, m \in M_k(t), p \in P \quad (10)$$

A VNFM can be located only at one NFVI-PoP. This constraint is defined by (11):

$$\sum_{p \in P} x_{m,k,p}(t) \leq 1, \forall k \in K, m \in M_k(t) \quad (11)$$

Equation (12) ensures that a VNFM is used only when it manages at least one VNF instance:

$$x_{m,k,p}(t) \leq \sum_{v \in V_k(t)} y_{v,m,k,p}(t), \forall k \in K, m \in M_k(t), p \in P \quad (12)$$

Each VNF instance has two thresholds to control the delay between its location and the associated VNFM as well between that VNFM and the NFVO. These constraints are enforced by (13) and (14):

$$(y_{v,m,k,p}(t)l_{v,q}(t) + y_{v,m,k,q}(t)l_{v,p}(t))\delta_{p,q}(t) \leq \varphi_v, \forall k \in K, v \in V_k(t), (p,q) \in E, m \in M_k \quad (13)$$

$$(y_{v,m,k,p}(t)h_q + y_{v,m,k,q}(t)h_p(t)) \leq \varphi_v, \forall k \in K, v \in V_k(t), (p,q) \in E, m \in M_k(t) \quad (14)$$

Constraint (15) guarantees that the utilized bandwidth on each edge does not exceed its capacity:

$$B^{lif}(p,q) + B^{lif}(q,p) + B^{mig}(p,q) + B^{rea}(p,q) + B^{rea}(q,p) \leq \gamma_{p,q}(t), \forall (p,q) \in E \quad (15)$$

where $$B^{mig}(p,q) = \sum_{k \in K} \sum_{m \in M_k(t-1)} x_{m,k,p}(t) x_{m,k,q}(t-1) g_{m,k}$$

$$B^{rea}(p,q) = \sum_{k \in K} \sum_{v \in V_k(t) \cap V_k(t-1)} \sum_{m \in M_k(t)} \left\{ z_{v,m,k,p}(t) h_q \left(1 - \sum_{p \in P} y_{v,m,k,p}(t)\right) \right\} \hat{s}_v + \left\{ y_{v,m,k,p}(t) h_q \left(1 - \sum_{p \in P} z_{v,m,k,p}(t)\right) \right\} s_v$$

Constraints (16) and (17) are the integrality constraints:

$$y_{v,m,k,p}(t) \in \{0,1\}, \forall k, v \in V_k(t), m \in M_k(t), p \in P \quad (13)$$

$$x_{m,k,p}(t) \in \{0,1\}, \forall k \in K, m \in M_k(t), p \in P \quad (17)$$

The MPP Algorithm

Figure 3:
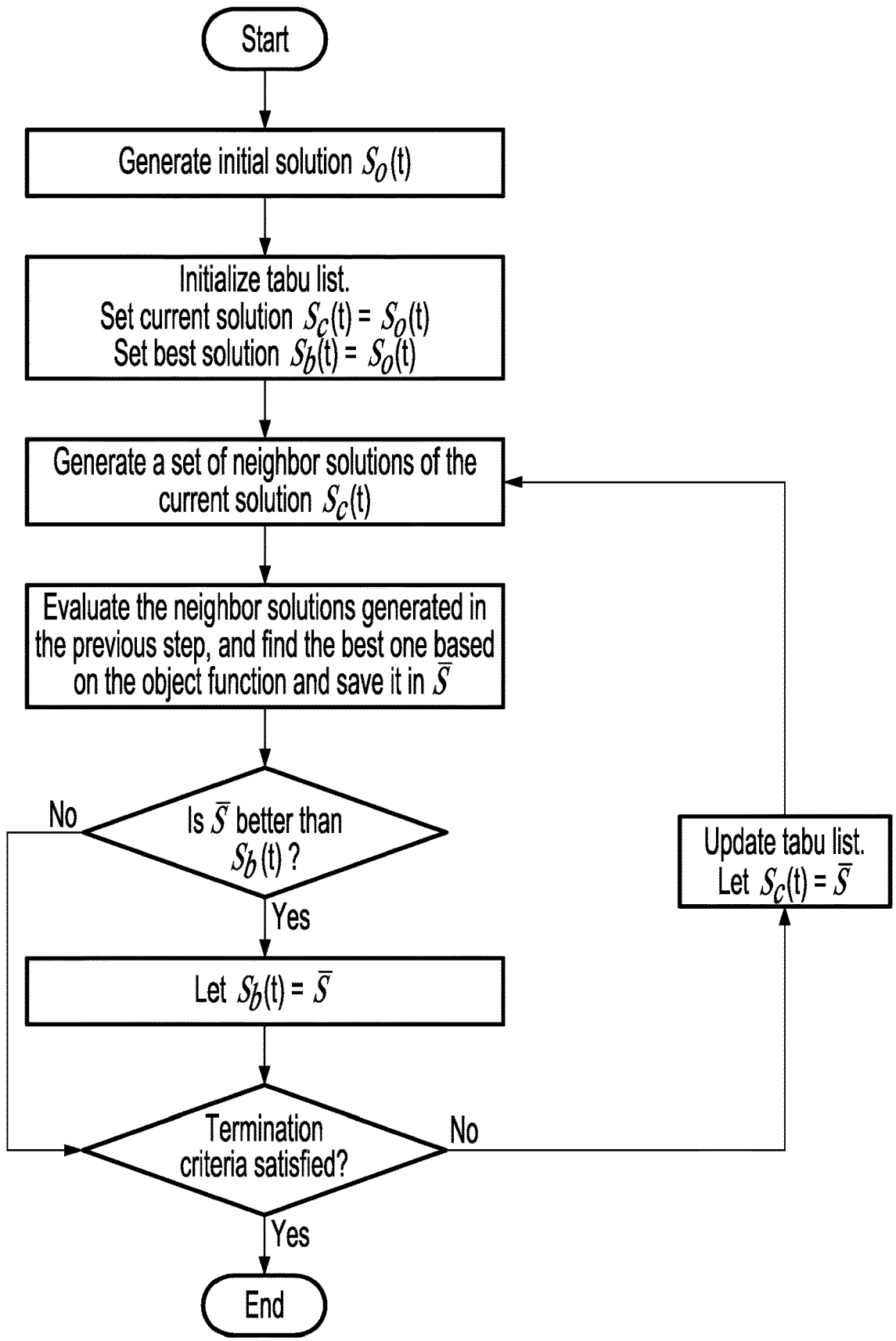
FIG. 3 is a flowchart of the tabu search algorithm in accordance with some embodiments.

FIG. 3 illustrates a method based on the tabu search algorithm to solve the MPP over each snapshot. Tabu search is a meta-heuristic designed for guiding a local search procedure to find a near optimal solution of combinatorial optimization problems. It starts exploring the search space from an initial solution and iteratively performs moves to transit from the current solution to another one in its neighborhood until the termination criterion is satisfied.

Next, different components of the proposed algorithm are presented with reference to FIGS. 4 to 8.

Initial Solution

Figure 4:
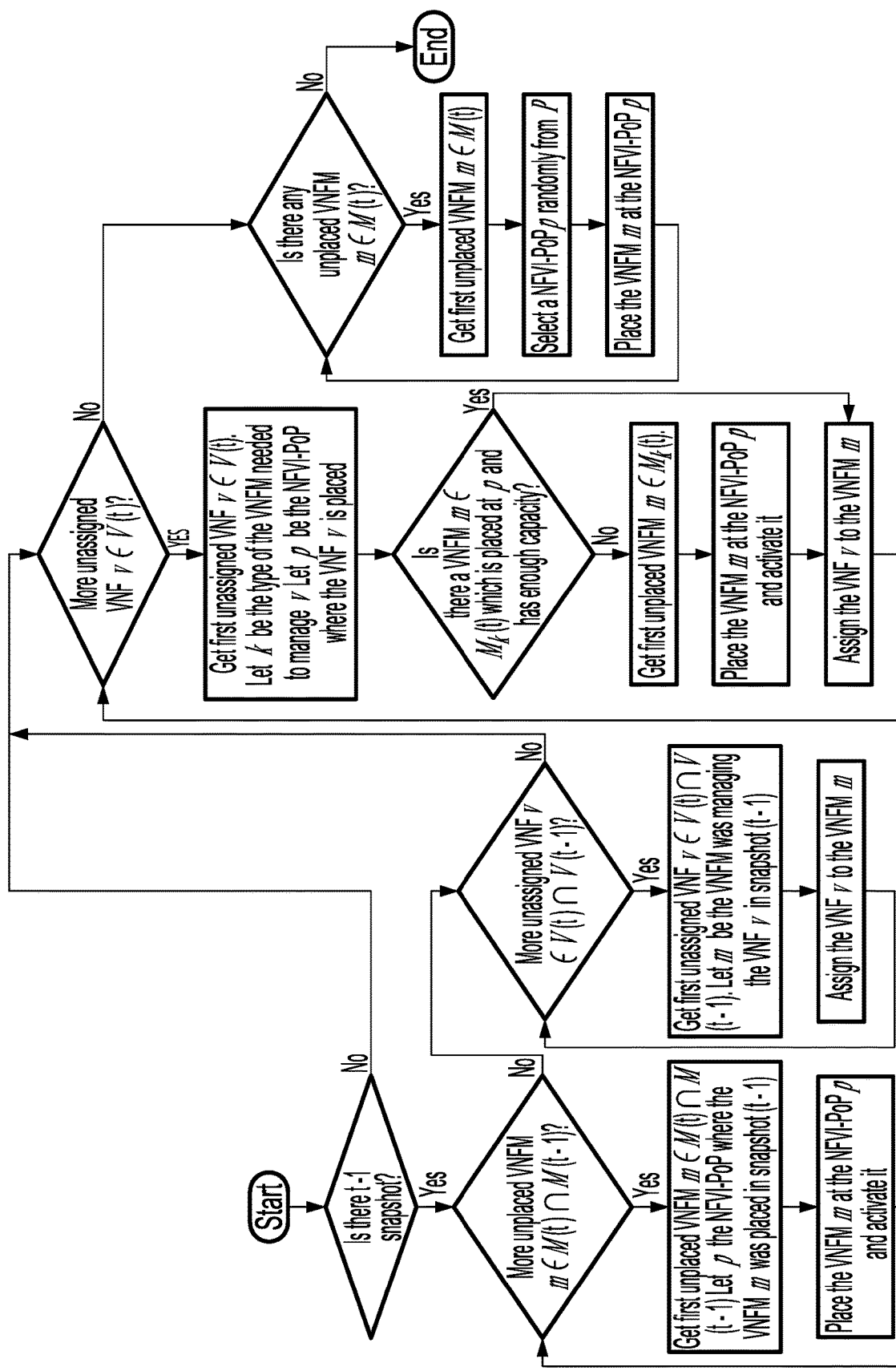
FIG. 4 is a flowchart presenting additional algorithm for generating initial VNFM placement in accordance with some embodiments.

As shown in FIG. 4, a simple greedy algorithm is used to obtain the initial solutions $S_0(t)$ for snapshot t. The algorithm has three main steps. The first step is executed only if there is a snapshot t−1. In this case, the initial solution $S_0(t)$ is constructed from the tabu search solution obtained in that snapshot. More precisely, the greedy algorithm activates and places each $m \in M_k(t-1)$, $\forall k \in K$ at the same NFVI-PoP used in t−1. It also assigns each $v \forall V(t) \cap V(t-1)$ to the same VNFM used in t−1. The following formulations describe how the initial solution $S_0(t)$ uses the decisions taken in snapshot t−1:

$$x_{m,k,p}(t) = x_{m,k,p}(t-1), \forall k \in K, m \in M_k(t-1), p \in P$$

$$y_{v,m,k,p}(t) = y_{v,m,k,p}(t-1), \forall k \in K, v \in V(t) \cap V(t-1), m \in M_k(t-1), p \in P$$

In the second step, the algorithm starts assigning every new VNF instance $v \in V(t) \setminus V(t-1)$ to an active VNFM that has enough capacity and located at the same NFVI-PoP. If none of the active VNFMs meets the aforementioned conditions, a new VNFM $m \in M(t) \setminus M(t-1)$ is activated and placed at the NFVI-PoP on which the VNF instance is located. Then, the new VNFM is assigned the VNF instance to manage it.

In the last step, the greedy deactivates every $m \in M_k(t)$, $\forall k \in K$ that does not have any assigned VNF instance so far in the initial solution $S_0(t)$, and places them randomly over the NFVI.

Those inactive VNFMs can be used later by the tabu search algorithm. The generated initial solution ensures that all constraints are satisfied except (14) and (15) which might be violated.

The proposed algorithm substantially improves the solution quality and ensure satisfying any of the violated constraints.

Neighborhood Structure

Figure 5:
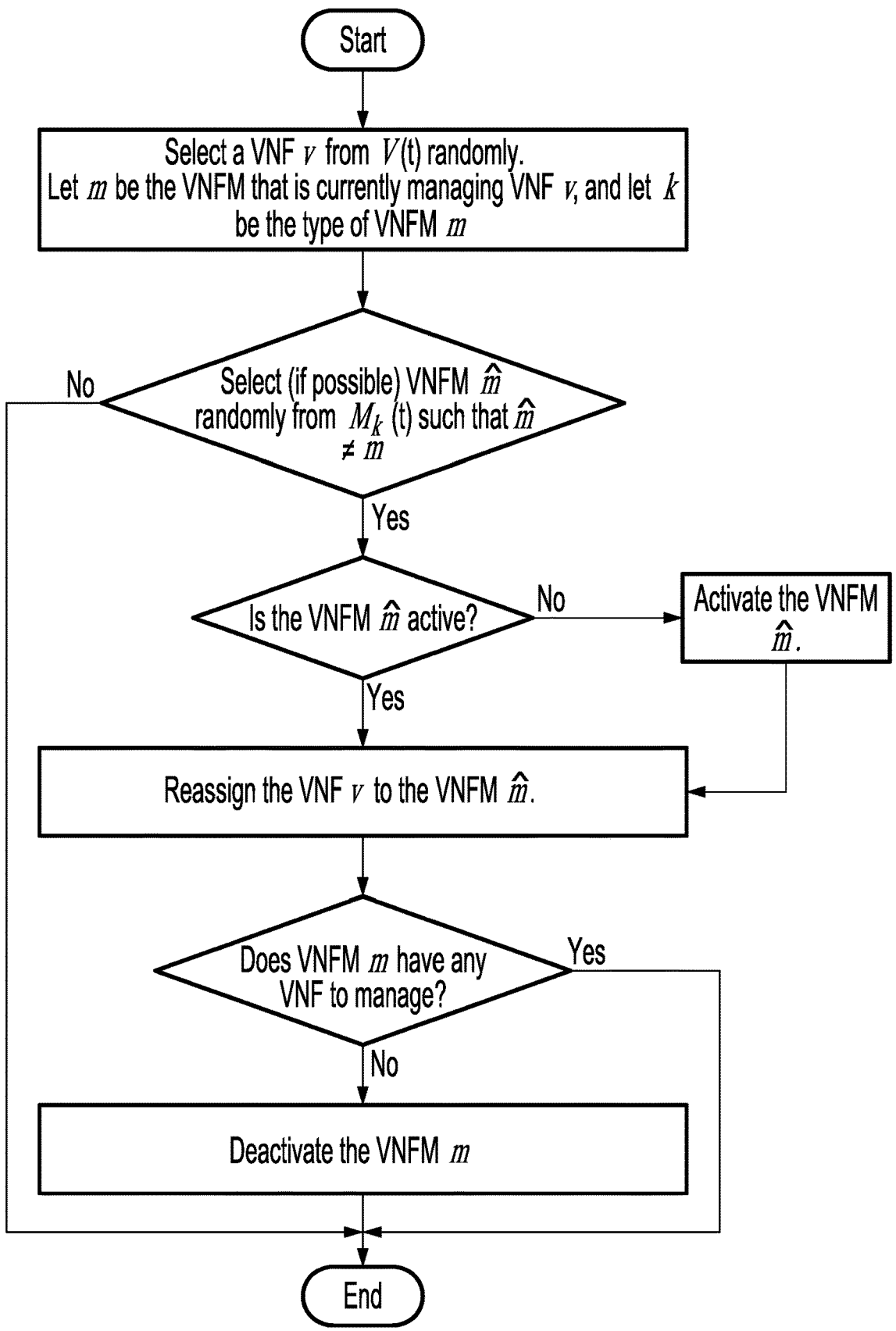
FIG. 5 is a flowchart presenting additional algorithm for handling VNF reassignment in accordance with some embodiments.

The tabu search algorithm employs four move types to generate a neighborhood solution defined as follows:

1) VNF reassignment: Referring to FIG. 5, a VNF instance is selected randomly and reassigned to a different VNFM. The new VNFM might be active or inactive. If it is the latter, the VNFM is activated. The old VNFM is deactivated if it has no more VNF instances associated with it.

Figure 6:
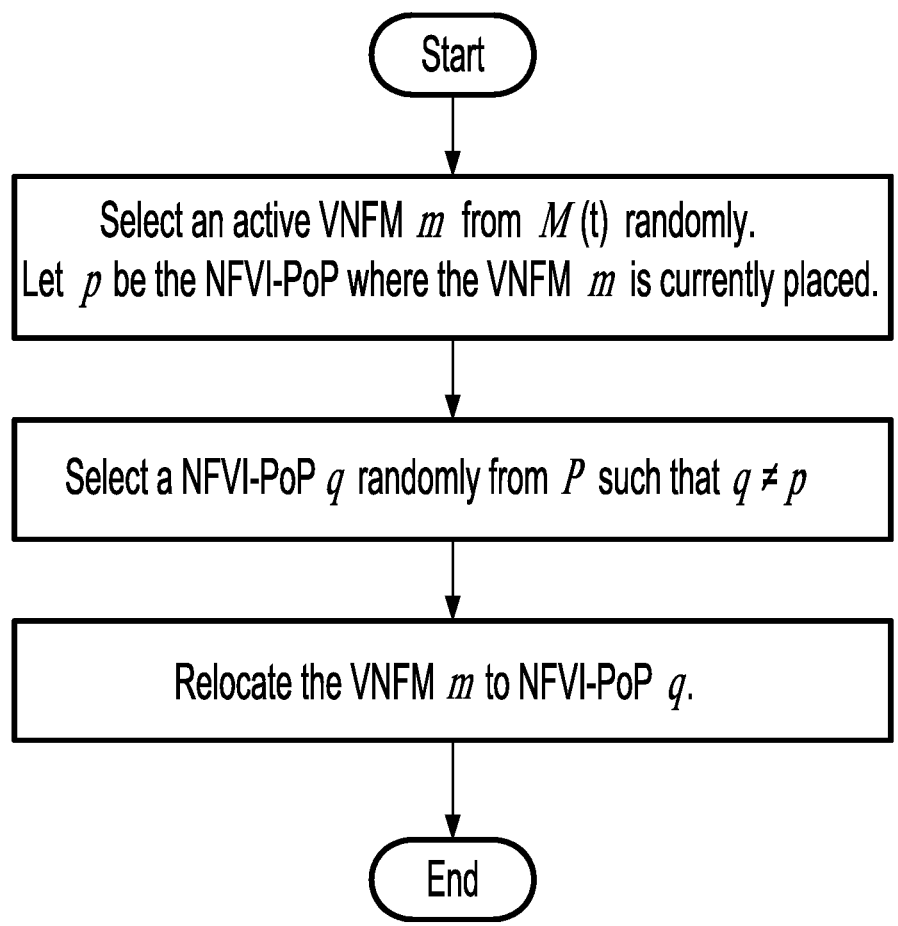
FIG. 6 is a flowchart presenting additional algorithm for handling VNFM migration or relocation in accordance with some embodiments.

2) VNFM relocation: Referring to FIG. 6, an active VNFM is selected randomly and moved to another NFVI-PoP. The new location is chosen such that the delay constraints for all assigned VNF instances are not violated.

Figure 7:
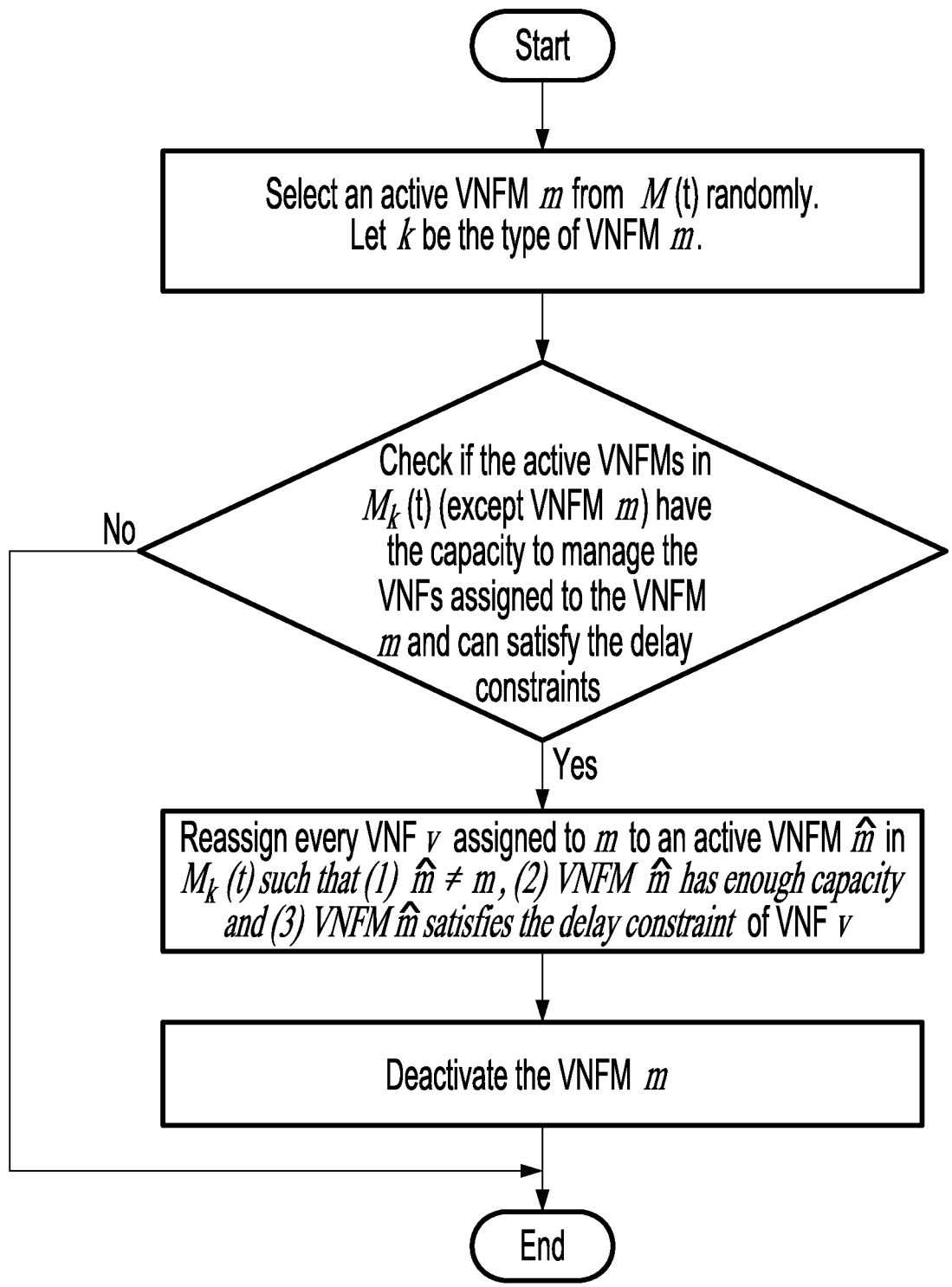
FIG. 7 is a flowchart presenting additional algorithm for handling bulk VNF reassignment in accordance with some embodiments.

3) Bulk VNF reassignment: Referring to FIG. 7, it is a composite move that compromises of a finite number of "VNF reassignment" moves. To that extent, an active VNFM is drawn randomly. Then, if the remaining active VNFMs have the enough capacity to manage its assigned VNF instances while satisfying their delay constraints, the VNF instances are reassigned, and the chosen VNFM is deactivated.

Figure 8:
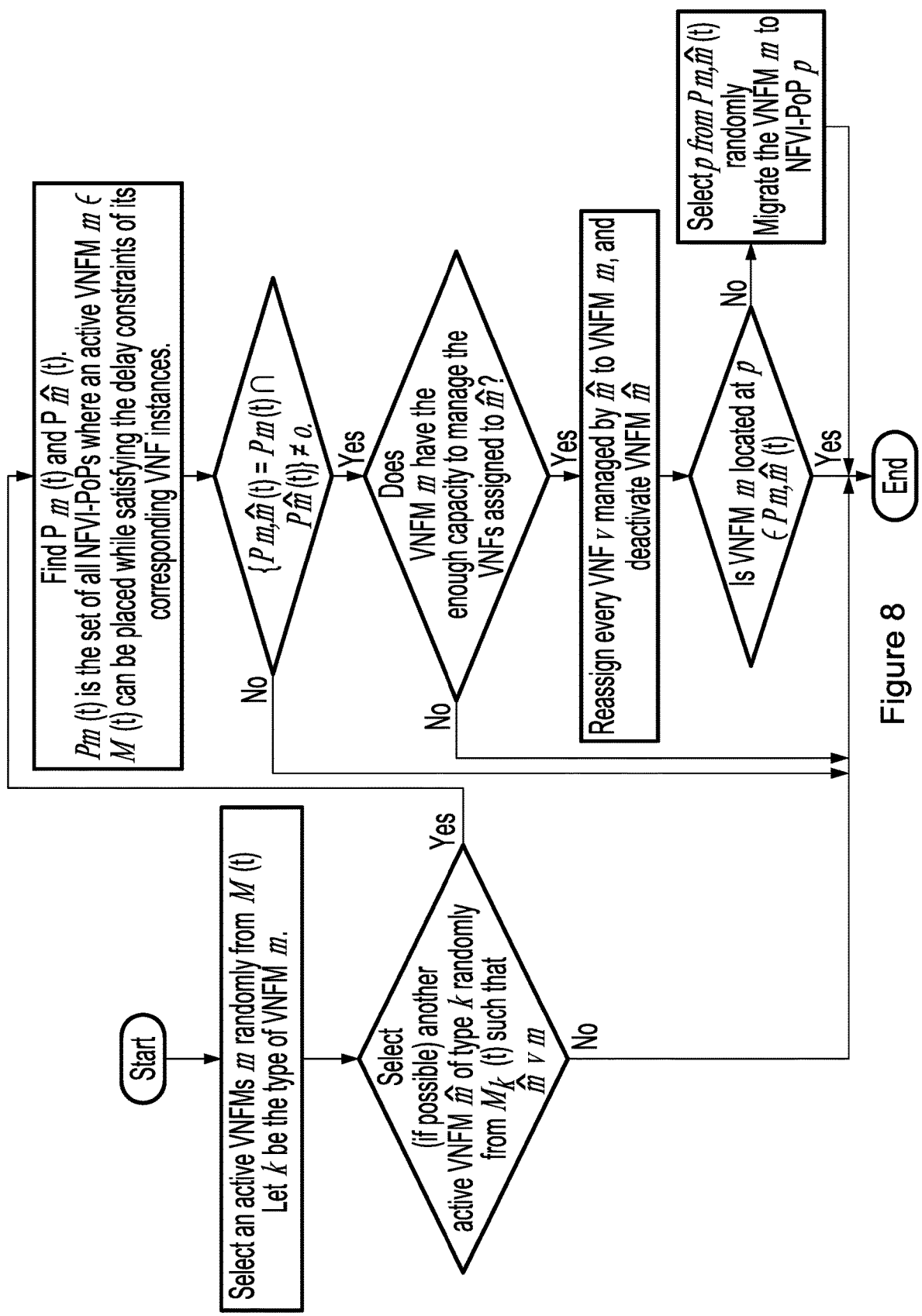
FIG. 8 is a flowchart presenting additional algorithm for handling VNFM deactivation in accordance with some embodiments.

4) VNFM Deactivation: Referring to FIG. 8, this is another composite move that includes a finite number of "VNF reassignment" and "VNFM relocation" moves. Let $P_m(t) \subseteq P$ encompass all NFVI-PoPs where an active VNFM $m \in M(t)$ can be placed while satisfying the delay constraints of its corresponding VNF instances. Then, two VNFMs m and $\hat{m}$ have coverage ovelapping if $\{P_{m,\hat{m}}(t) = P_m(t) \cap P_{\hat{m}}(t)\} \neq \emptyset$. To that extent, two VNFMs m and $\hat{m}$ are selected randomly and coverage overlaping is assessed. If the condition holds and the VNFM m has the enough capacity to serve the VNF instances assigned to $\hat{m}$, then these VNF instances are reassigned to m and the $\hat{m}$ is deactivaed. If the VNFM m is not already placed at $p \in P_{m,\hat{m}}(t)$, then it is relocated to a NFVI-PoP that belongs to that set, i.e. $P_{m,\hat{m}}(t)$.

Tabu List and Aspiration Criterion

Tabu search uses memory structures, called tabu lists, to record information about the recent history of the search. The search uses this information to avoid the local optimums and prevent the cycling to previously visited solutions. In the present algorithm, the tabu list records the moves that have been made in the recent past and forbids them as long as they are on the list. These moves are known as tabu moves. They stay on the tabu list for a certain number of iterations. This number is set to a constant value that is equal to 300. The number is small compared to the number of VNF instances (i.e. |V(t)|) in large-scale deployments. However, it is big enough to prevent the cycling. Further, a tabu move can be selected and implemented if it meets a condition known as the aspiration criterion. It is defined as releasing a move from its tabu status and accepting it if that move produces a solution better than the best solution found so far.

Acceptance Criteria

In each iteration, the tabu search algorithm evaluates a set of candidate moves and selects the best move, i.e. the move that generates the best neighbor solution. The algorithm uses a hierarchical objective function to evaluate the neighbor solutions, where the primary objective is minimized first and then, for the same primary objective value, the secondary objective is minimized. The primary objective is defined as the sum of the model objective function defined by (7) and the total penalty associated with the solution. The proposed algorithm penalizes the violation of the constraints (10), (13), (14) and (15). The solution is assigned a penalty proportional to the level of the violation. The secondary objective is the sum of delay between the active VNFMs and their associated VNF instances. The rationale for that is to reward the move that reassigns a VNF instance to a closer VNFM. The ultimate goal is to maximize $P_m(t)$ for all active VNFMs, then detect and eliminate any coverage overlapping (if possible). Moreover, the objective function is computed in incremental way. In each iteration, the algorithm computes only the difference that a move makes in the objective function, rather than to re-compute the objective function. This technique results in several orders of magnitude decrease in the execution time and allows the algorithm to transit quickly from one solution to another.

Termination Criteria

Figure 9:
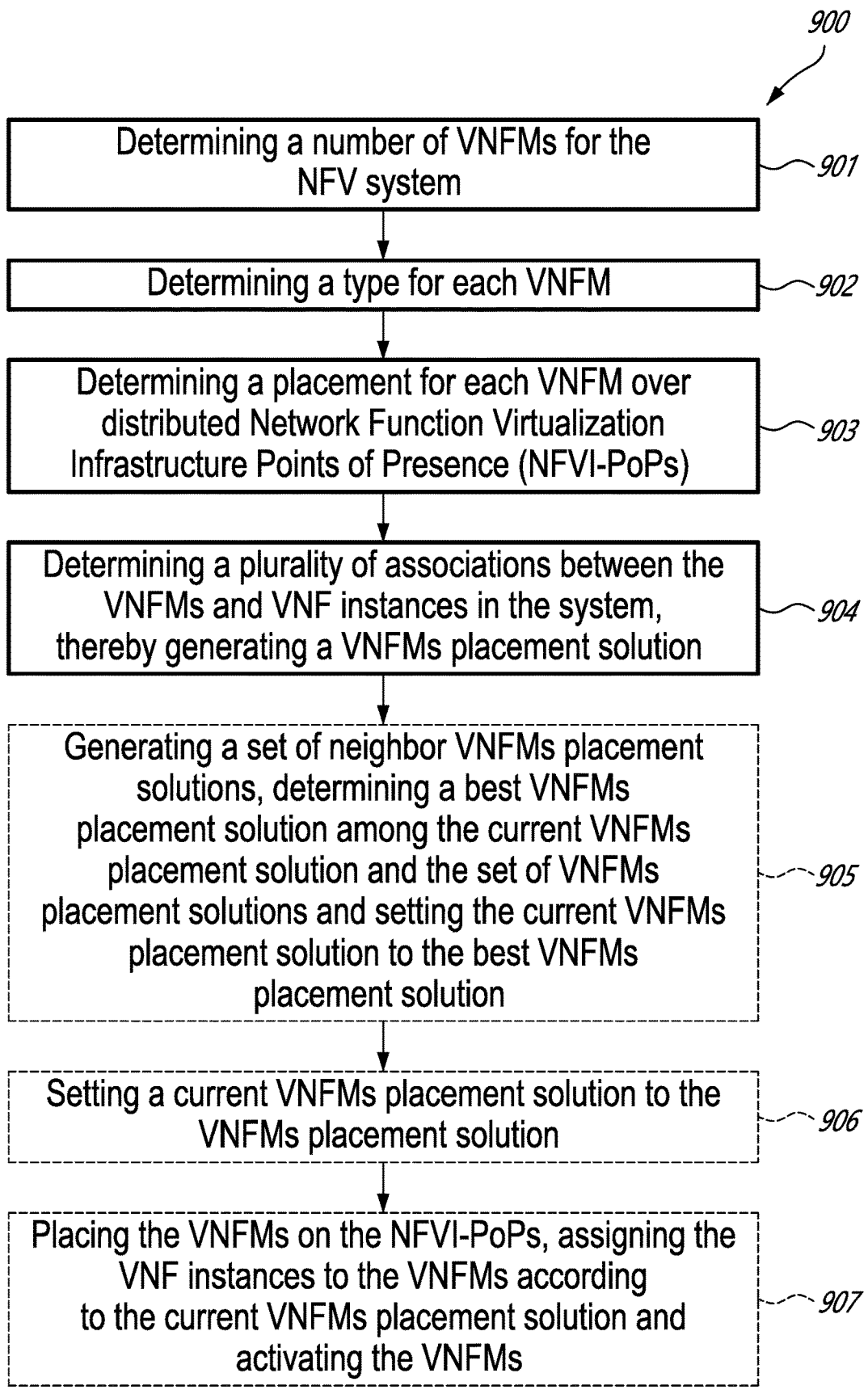
FIG. 9 is a flowchart of a method in accordance with some embodiments.

The algorithm stops when the best solution found does not improve for a certain number of consecutive iterations. This number is defined as $25\sqrt{|V(t)|} + |M(t)|$. This formula is designed to allows the number to grow with respect to V(t) and M(t), but in a less degree than a linear function of V(t) in the large-scale deployments. The multiplier 25 is adjusted experimentally to make the trade-off between the execution time and the final solution quality. A person skilled in the art would understand that other experiment could lead to finding different multipliers and that the value 25 is provided only as an example. Further adjustment of these values, variables, constraints and formulas, according to live system results would, of course, fall within the scope of this disclosure and within the skills of a person versed in the art. Turning to FIG. 9, there is provided a method 900, for placement of virtual network functions managers (VNFMs) in a network functions virtualization (NFV) system. The method comprises determining, 901, a number of VNFMs for the NFV system; determining, 902, a type for each VNFM; determining, 903, a placement for each VNFM over distributed Network Function Virtualization Infrastructure Points of Presence (NFVI-PoPs); and determining, 904, a plurality of associations between the VNFMs and VNF instances in the system, thereby generating a VNFMs placement solution.

The method may further comprise setting, 906, a current VNFMs placement solution to the VNFMs placement solution. The method may further comprise placing, 907, the VNFMs on the NFVI-PoPs, assigning the VNF instances to the VNFMs according to the current VNFMs placement solution and activating the VNFMs. The method may further comprise generating, 905, a set of neighbor VNFMs placement solutions, determining a best VNFMs placement solution among the current VNFMs placement solution and the set of VNFMs placement solutions and setting the current VNFMs placement solution to the best VNFMs placement solution.

Determining the best VNFMs placement solution may be executed iteratively until a termination criterion is satisfied.

Referring again to FIG. 5, generating the set of neighbor VNFMs placement solutions may comprise randomly selecting a VNF currently assigned to a first active VNFM; assigning the VNF to a second VNFM of a same type; activating the second VNFM, if the second VNFM is inactive; and deactivating the first active VNFM, if there are no associations between the first active VNFM and other VNF instances.

Alternatively, referring again to FIG. 6, generating the set of neighbor VNFMs placement solutions may comprise randomly selecting an active VNFM with a placement on a first NFVI-PoP; randomly selecting a second NFVI-PoP, different from the first NFVI-PoP; and relocating the randomly selected active VNFM to the randomly selected second NFVI-PoP.

Alternatively, referring again to FIG. 7, generating the set of neighbor VNFMs placement solutions may comprise randomly selecting an active VNFM; upon determining that other active VNFM of a same type have enough capacity to manage VNFs assigned to the randomly selected active VNFM while satisfying delay constraints, reassigning each VNF assigned to the selected active VNFM to any one of the other active VNFM that has enough capacity to manage the VNF; and deactivating the randomly selected active VNFM.

Alternatively, referring again to FIG. 8, generating the set of neighbor VNFMs placement solutions may comprise randomly selecting a first active VNFM; randomly selecting a second active VNFM, different from the first active VNFM; finding an intersection of respective first and second subsets of NFVI-PoPs where the first and the second active VNFMs can be placed while satisfying respective delay constraints for all VNF instances assigned to the first and the second active VNFMs; reassigning all VNFs assigned to the second active VNFM to the first active VNFM if the intersection of the respective first and second subsets of NFVI-PoPs is not empty and if the first active VNFM has enough capacity to manage the VNFs and deactivating the second active VNFM; and relocating the first active VNFM to another NFVI-PoP randomly selected from intersection of respective first and second subsets of NFVI-PoPs if the NFVI-PoP where the first active VNFM is located doesn't belong to the intersection of respective first and second subsets of NFVI-PoPs.

Determining the best VNFMs placement solution may comprise selecting the VNFMs placement solution which minimizes operational cost which is the sum of a VNFM resource cost, a VNFs lifecycle management cost over time period, a VNFM migration cost and a VNFs reassignment cost, a penalty value proportional to a level of violation of system constraints generated by the neighbor solution, and a sum of delays between active VNFMs and associated VNF instances for the neighbor solution.

According to another embodiment, there is provided a method for determining an optimal number of virtual network functions managers (VNFMs) in a network functions virtualization (NFV) system, a type for each VNFM, a placement for each VNFM over distributed Network Function Virtualization Infrastructure Points of Presence (NFVI-PoPs), and a plurality of associations between the VNFMs and VNF instances. The method comprises the steps of generating an initial solution comprising a first number of VNFMs, the placement of each VNFM over the NFVI-PoPs, and assignation of VNFs to the VNFMs; assigning to a current solution the initial solution; and iteratively generating a set of neighbor solutions; evaluating the neighbor solutions, including the current solution, and identifying a best solution among the neighbor solutions; and assigning to the current solution the best solution; until a termination criteria is satisfied.

Generating an initial solution, at a system snapshot t, may comprise, when there exists a snapshot t−1: placing, at snapshot t, each VNFM having a virtualized network function (VNF) instance assigned to it at a same NFVI-PoP as at snapshot t−1; assigning, at snapshot t, each VNF that existed at t−1 to the same VNFM; if an existing VNFM has enough capacity and is located at the same NFVI-PoP as the new VNF assigning, at snapshot t, the new VNF instance to the existing VNFM; else, activating and placing a new VNFM at the same NFVI-PoP and assigning the VNF instance to the new VNFM; and deactivating, at snapshot t, each VNFM not having a VNF instance assigned to it and placing the VNFM randomly over the NFVI-PoPs.

Generating a neighbor solution may comprise, for at least a subset of the VNFs: randomly selecting a VNF currently assigned to a first VNFM; assigning the VNF to a second VNFM of the same type; activating the second VNFM, if the second VNFM was previously deactivated; and deactivating the first VNFM if the first VNFM has no remaining VNF assigned to it.

Generating a neighbor solution may comprise, for at least a subset of the VNFMs: randomly selecting an active VNFM; randomly selecting a NFVI-PoP; and relocating the randomly selected VNFM to the randomly selected NFVI-PoP.

Generating a neighbor solution may comprise, for at least a subset of the VNFMs: randomly selecting an active VNFM; verifying if remaining active VNFMs of the same type have enough capacity to manage the VNFs assigned to the selected active VNFM while satisfying delay constraints; if the remaining active VNFMs of the same type have enough capacity, reassigning each VNF assigned to the selected active VNFM to one of the remaining active VNFM; and deactivating the selected active VNFM;

Generating a neighbor solution may comprise, for at least a subset of the VNFMs: randomly selecting a first active VNFM; randomly selecting a second active VNFM; finding an intersection of respective first and second subsets of NFVI-PoPs where the first and the second active VNFMs can be placed while satisfying respective delay constraints for all VNF instances assigned thereto; reassigning all VNFs assigned to the second VNFM to the first VNFM if the intersection of the first and second subsets of NFVI-PoPs is not empty and if the first VNFM have enough capacity to manage the VNFs; deactivating the second VNFM; and if the NFVI-PoP where the first VNFM is located doesn't belong to the intersection of the first and second subsets of NFVI-PoPs, relocating the first VNFM to another NFVI-PoP randomly selected from intersection of the first and second subsets of NFVI-PoPs.

Generating a set of neighbor solutions may comprise executing on of the previous methods in iteratively.

Evaluating the neighbor solution may comprise computing an operational cost for switching from snapshot (t−1) to snapshot t; determining a penalty value proportional to a level of violation of system constraints generated by the neighbor solution; and computing a sum of delays between active VNFMs and associated VNF instances for the neighbor solution.

Operational cost may be the sum of four components: VNFM resource cost, VNFs lifecycle management cost over snapshot t, VNFM migration cost and VNFs reassignment cost.

Identifying a best solution among the neighbor solutions may comprise selecting the neighbor solution which minimizes the operational cost, the penalty value and the sum of delays.

The termination criteria for determining the optimal number VNFMs may be reached when new iterations do not minimize further the operational cost, the penalty value or the sum of delays.

Evaluation Scenarios

The MPP has both static and dynamic versions. In the static MPP, the system reconfigurations, i.e. VNFM migration and VNF reassignment, are either not required, or are not desirable. Many scenarios might motivate this version. One possibility is that the system does not change (e.g. number of VNF instances and network conditions) over time, or the changes might be insignificant. Another scenario is to employ the over-provisioning in the number of VNFMs to avoid the system reconfigurations. However, this requires an estimation of the maximum number of VNF instances that can exist in the system and their locations. In this version, the migration cost ($C^{mig}(t)$) and reassignment cost ($C^{rea}(t)$) are not incurred. In contrast, the system reconfigurations are desired in the dynamic version of the MPP. The number of VNF instances, their locations and network conditions might change over snapshots and the system should be readjusted to adapt to these changes.

To this extent, several experiments were performed considering both static and dynamic MPP. In the static problem, the experiments are designed to (1) evaluate the proposed tabu search algorithm in terms of the solution quality and execution time, (2) study the impact of the optimization objective weight, and (3) investigate the effect of NFVO location and the architectural options related to VNFM (generic vs. VNF-Specific). On the other hand, the experiments related to the dynamic MPP aim to study the gain that could potentially be achieved by reconfiguring the system. In both versions, the snapshot duration is set to one hour.

Turning to FIGS. 10-15, and to the following description, the simulation setup is presented, followed by the description of the experiments for the static and dynamic MPP.

Simulation Setup

1) NFVI: An existing network provided by WonderNetwork was used to build the NFVI used in these experiments. WonderNetwork is a networking solution provider that operates a network of servers in 230 locations distributed over many countries. It provides the real-time hourly delay information between each pair of locations. Each location in this network is considered as a potential NFVI-PoP. The cost of the compute resource in each NFVI-PoP ($c_p^{cam}(t)$) is set to the electricity price for its location. The price ranges within [0.0833, 0.1776] $/kWh. In addition, the delay information is used as a delay on the edges between each pair of NFVI-PoPs. The bandwidth cost associated with all edges ($c_{p,q}^{net}(t)$) is linear with the traffic volume and equals to $0.155/GB. The capacity of all edges ($\delta p,q(t)$) is set to 10 Gbps. 2) VNFM: The live migration of a Virtual Machine (VM) involves transferring the VM running state (e.g. memory) and the virtual disk. It is assumed that the VM hosting a VNFM is a medium size with 2 CPUs, 40 GB disk and 4 GB memory. Then, for $\forall k \in K, m \in M(t)$, the bandwidth consumed in the migration ($gm,k$) of the VNFM is set to the sum of the VM disk and memory sizes, i.e. 44 GB. The migration cost ($c_{m,k}^{mig}(t)$) is computed as the cost of the bandwidth consumed in the migration which is equal to 44×0.155. The VNFM capacity ($n_k$) is set to 80.

3) VNF: It is assumed that the VNF instances managed by the MANO fall into two classes: class one (C1) and class two (C2). Class one contains complex and high-throughput transactional VNFs such as the Serving Call Session Control Function (S-CSCF) and the Policy and Charging Rules Function (PCRF). These VNFs have stringent reliability and performance requirements since the performance anomaly (e.g. VNF failure and performance degradation) has a significant impact on thousands of users. On the other hand, class two includes simple VNFs such as the firewall that might be used in a residential virtual Customer Premises Equipment (vCPE). In this case, the VNF performance anomaly affects a small group of users. Hence, these VNFs have relaxed requirements compared to C1. In accordance with that, the threshold delay is set on the links, i.e. $\varphi_v(t)$ and $\omega_v(t)$, to be smaller in case of C1 compared with C2. However, for both C1 and C2, $\varphi_v(t)$ is set smaller than $\omega_v(t)$ in order to place the VNFM closer to the VNF instance than the NFVO. Table I, below, shows the selected thresholds values. Moreover, and for simplicity, $s_v$ and $\hat{s}_v$ (bandwidth consumed in VNF instance reassignement) are assumed equal and are set to 2 MB. The VNF reassignment cost $c_v^{rea}(t)$ is considered the cost of the bandwidth consumed in the reassignment and is computed as $$\frac{(2+2) \times 0.155}{1024}.$$

TABLE I

EXPERIMENT PARAMETERS PER VNF CLASS

| Parameters | C1 VNF | C2 VNF |
|---|---|---|
| Maximum delay between VNFM and VNF instance($\varphi_{v(t)}$) | 35 milliseconds | 60 milliseconds |
| Maximum delay between NFVO and VNFM ($\omega_{v(t)}$) | 70 milliseconds | 100 milliseconds |
| Number of VNF iudicators | 30 | 15 |
| Number of resource performance metrics | 60 | 20 |
| VNFM data collection period | 30 seconds | 1 minute. |
| NFVO data collection period | 3 minutes | 6 minutes |
| Bandwidth consumed between NFVO and VNFM ($u_v^{O,M}(t)$) | $5.3 \times 10^5$ byte/hour | $1.125 \times 10^5$ byte/hour |
| Bandwidth consumed between NFVO and VIM ($u_v^{O,I}(t)$) | 0 byte/hour | 0 byte/hour |
| Bandwidth consumed between VNFM and VIM ($u_v^{M,I}(t)$) | $1.32 \times 10^6$ byte/hour | $3.45 \times 10^5$ byte/hour |
| Bandwidth consumed Between VNFM and VNF/EM ($u_v^{M,V}(t)$) | $1.86 \times 10^6$ byte/hour | $3.3 \times 10^5$ byte/hour |

4) Network Traffic: Traffic between different functional blocks in NFV framework vary widely depending on many factors including, but not limited to, communication protocols, VNFs, implementation, and configurations. In these experiments, it is assumed that the communication between various functional blocks is through REST (Representational State Transfer) over Hypertext Transfer Protocol (HTTP) protocol, with JavaScript Object Notation (JSON) as data exchange format. The total header size for an HTTP request-response is set to 500 bytes. In addition, the traffic generated by the VNF instances monitoring in the evaluation experiments is used. Monitoring is an essential function in the lifecycle management that involves collecting and analyzing data related to the VNF instances to ensure they meet the desired requirements. In this context, the VNFM periodically collects the VNF resources performance metrics from VIM and the VNF indicators information from the VNF instance or EM. It is further considered that the NFVO periodically collects this information from the VNFM to analyze it. Nevertheless, it is assumed that the collection period, which specifies the periodicity at which data is collected, is shorter for the VNFM compared to the NFVO. Because of C1 VNFs requirements, it is considered that the NFVO and VNFM collection periods are shorter for C1 compared to C2. It is also assumed that a VNF in C1 has more VNF resources performance metrics and VNF indicators compared to C2. Further, based on the ETSI information model, it is possible to estimate the size of the metadata that describes one resource performance metric and one VNF indicator in JSON format to be 350 and 250 bytes, respectively. Table I presents the data collection periods and the network traffic information between different functional blocks.

Static MPP Experiments

Figure 10:
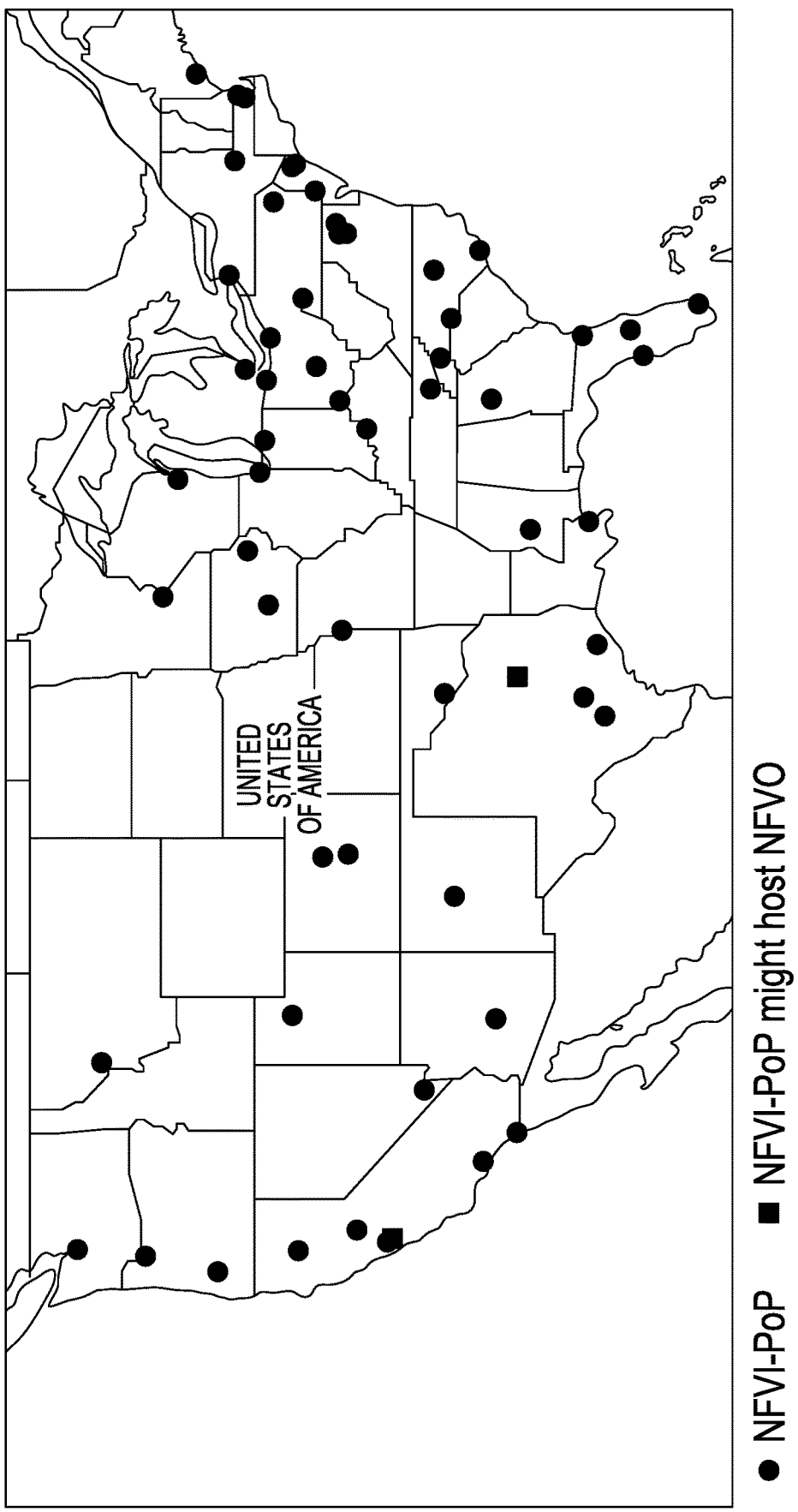
FIG. 10 is an illustration of a map of the United-States showing the location of 64 NFVI-PoPs in accordance with some embodiments.

Both small-scale and large-scale deployments are covered. Three different sizes of NFVI are considered in the small-scale deployments: 8, 16 and 24 NFVI-PoPs. In the large-scale deployments, the NFVI is made of 64 NFVI-PoPs. All these NFVI-PoPs in both cases are distributed across the USA, as shown in FIG. 10. Two different NFVI-PoPs ($h_r$) are used to host the NFVO. One NFVI-PoP is located in Dallas with a central location in the NFVI structure while the other is located in San Jose; which is considered an edge NFVI-PoP in the NFVI structure. FIG. 10 shows the locations. Moreover, two architectural options related to VNFM are considered. The first is to use VNF-specific VNFM in the system so that a distinct VNFM type manages each VNF class. The other option considers that a generic VNFM can manage both classes. The number of the used VNF instances ranges from 100 to 500 in the small-scale deployments, and from 1000 to 5000 in the large-scale ones. Each VNF instance is chosen uniformly at random from the two VNF classes, and placed at a NFVI-PoP selected uniformly at random.

Dynamic MPP Experiments

In the dynamic deployment experiments, it is assumed that the demand is temporally distributed in three equal time-slot periods during the day: morning, afternoon and night. Each time-slot period is 8 snapshots long. In the morning time-slot, there is a total of 300 VNF instances (225 C1 and 75 C2). At the beginning of the afternoon time-slot, the C1 VNF instances are scaled-in to 75 instances, and C2 VNF instances are scaled-out to 225 instances. Lastly, the demand falls at the beginning of night time-slot, so the system scales in each of the C1 and C2 VNF instances to 50, i.e. total of 100 VNF instances. Further, the NFVI consists of 16 NFVI-PoPs located on the east coast of the USA (i.e. same time zone). VNF instances are placed randomly at the NFVI-PoPs.

Evaluation Results

The performance of the tabu search algorithm is now evaluated, by covering various aspects. The obtained results are compared to those derived based on exact and first-fit greedy algorithm. The tabu search algorithm is implemented in JAVA. The ILP model is implemented and solved in CPLEX 12.6.3. The first-fit greedy algorithm is exploited to assess the impact of a simple VNFM placement on the operational cost. It is also used as a baseline to evaluate the performance of tabu search algorithm when the optimal solution cannot be obtained, i.e. for the large-scale scenario. Herein, the first-fit greedy algorithm iterates over the set of VNF instances. At a specific iteration, it assigns the VNF instance to the first VNFM with adequate available capacity. Otherwise, a new VNFM is placed at the first NFVI-PoP that satisfies the MPP constraints. Then, the VNF instance is assigned to that VNFM. The first-fit algorithm does not change the VNF assignment; neither does migrate the VNFM. It removes the VNFM if that VNFM has no longer any assigned VNF instance. Moreover, in all experiments, unless mentioned otherwise, all cost weights are set to 1 and a distinct VNFM type is used for each of the C1 and C2 VNF classes, i.e. VNF-Specific VNFM.

Algorithm Performance Evaluation

Figure 11A:
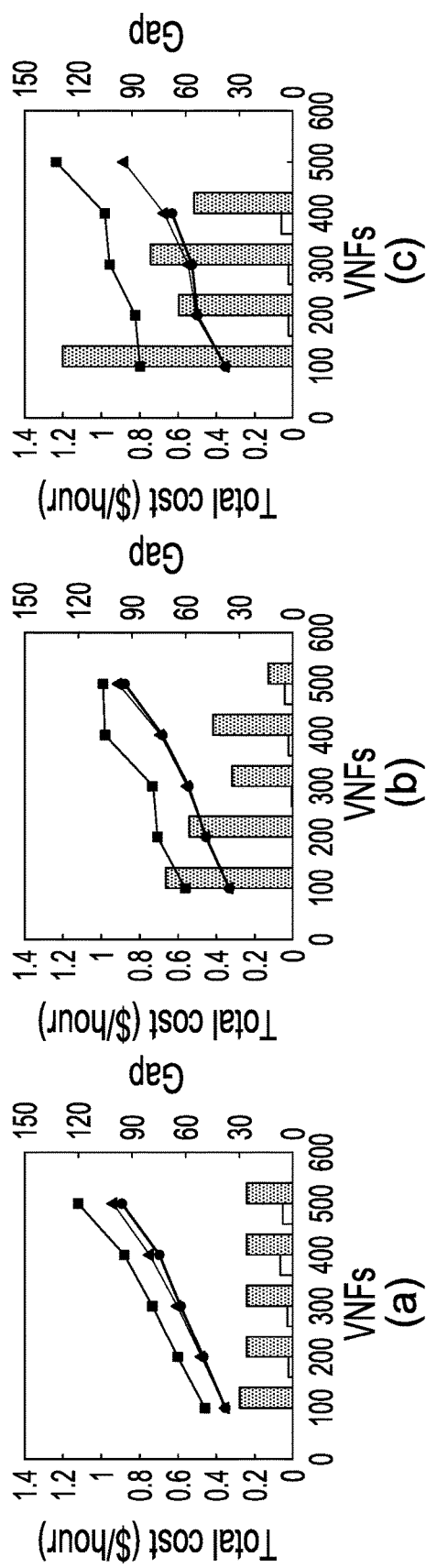
FIG. 11a illustrates graphs showing total cost for optimal, tabu and greedy solutions for (a) 8 PoPs, (b) 16 PoPs and (c) 24 PoPs with $\varepsilon=1$ in accordance with some embodiments.

First, the performance of the tabu search algorithm is assessed by evaluating the quality of the derived solution against the optimal solution obtained based on CPLEX and the greedy first-fit approach. FIG. 11a shows the overall operational cost corresponding to the optimal solution, the greedy first-fit solution, as well as the average of 10 runs of the tabu search algorithm. The results are derived with respect to a varying number of VNF instances in the system for 8 (a), 16 (b) and 24 (c) NFVI-PoPs. And the results are derived assuming the NFVO is located in Dallas. The average gap between the tabu search and greedy algorithm with respect to the optimal cost are also portrayed in the figure. It is observed that the tabu search algorithm leads to very high-quality solutions in most of the cases, and reaches optimality in many of them. In particular, it is noticed that the average gap remains smaller than 9% for the 8, 16 and 24 NFVI-PoPs. Instead, the gap for the greedy algorithm can reach very high values that can overpass 100%.

Figure 11B:
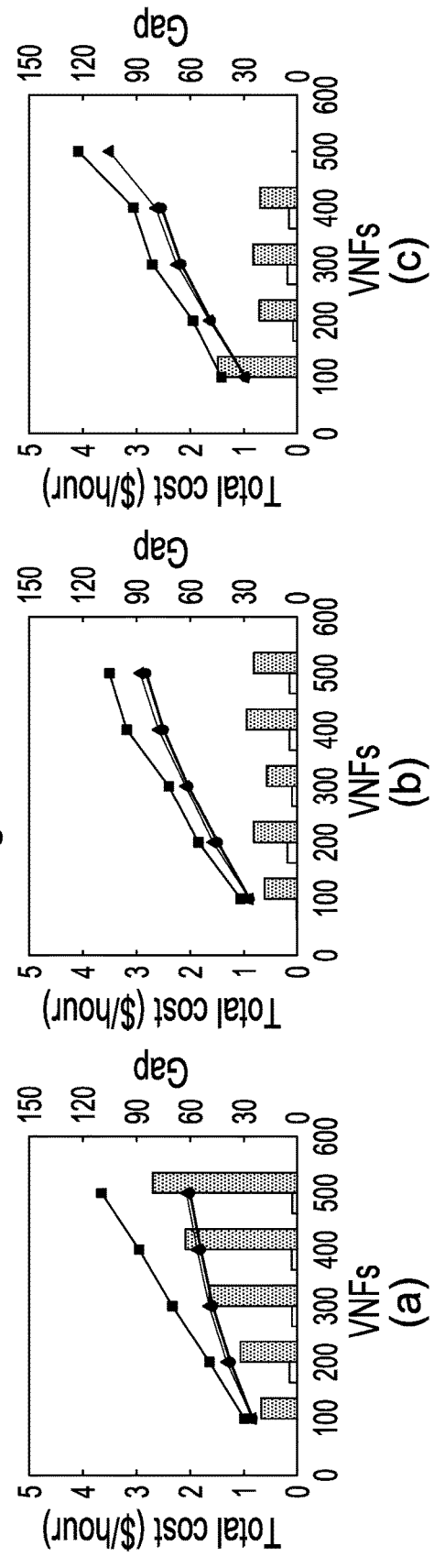
FIG. 11b illustrates graphs showing total cost for optimal, tabu and greedy solutions for (a) 8 PoPs, (b) 16 PoPs and (c) 24 PoPs with $\varepsilon=20$ in accordance with some embodiments.

Similarly, FIG. 11b shows the overall operational cost for the optimal, greedy first-fit and average tabu search solution, for 8 (a), 16 (b) and 24 (c) NFVI-PoPs, with a varying number of VNF instances in the case of $\varepsilon=20$. There also, the results are obtained by assuming the NFVO is located in Dallas. It is observed that the tabu search algorithm again significantly outperforms the greedy heuristic, with results that are very close to optimality, with average gaps that are smaller than 8%. It is noted that the same results are derived by assuming the NFVO is located in San Jose. The obtained results, not illustrated, confirm as well the high-quality solutions that are derived based on the tabu search algorithm.

TABLE II

AVERAGE EXECUTION

| Experiment Parameters | | | Execution, Time(s) | |
|---|---|---|---|---|
| Number of NFVI-PoPs | Number of VNEs | $\varepsilon$ | CFLEX | Tabu Search Algorithm |
| 8 | 100 | 1 | 0.24 | 0.41 |
| 8 | 100 | 20 | 0.23 | 0.33 |
| 8 | 200 | 1 | 3.19 | 0.83 |
| 8 | 200 | 20 | 4.20 | 0.55 |
| 8 | 500 | 1 | 462.80 | 1.80 |
| 8 | 500 | 20 | 68.60 | 1.67 |
| 16 | 500 | 1 | 45397.80 | 2.40 |
| 16 | 500 | 20 | 5573.97 | 1.67 |
| 24 | 500 | 1 | ∞ | 1.98 |
| 24 | 500 | 20 | ∞ | 1.42 |
| 64 | 1000 | 1 | ∞ | 5.03 |
| 64 | 5000 | 1 | ∞ | 29.80 |

Table II shows the average execution time of the tabu search algorithm compared to CPLEX. They were run on a server with 2×12-Core 2.20 GHz Intel Xeon E5-2650v4 CPUs and 128 GB memory. The results are for a subset of the experiments in which the NFVO is placed in Dallas. The results show that CPLEX is slightly faster for a few of the very small scale problems in which the execution time is less than one second. However, in all other cases, the algorithm significantly outperforms CPLEX by many orders of magnitude.

Optimization Objective Weight

Figure 12A:
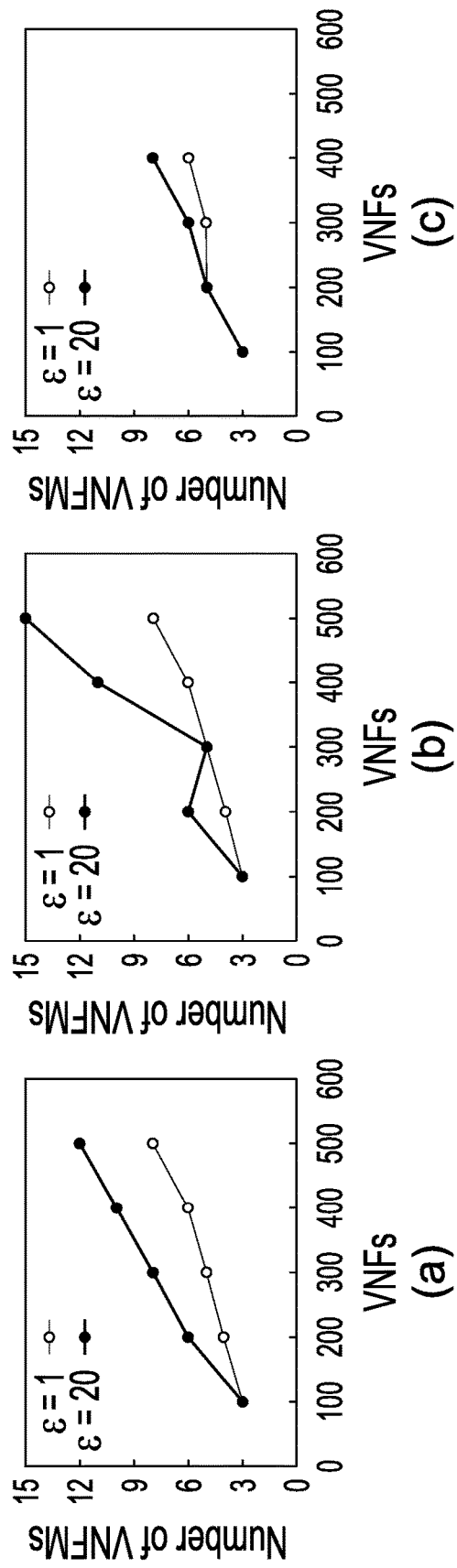
FIG. 12a illustrates graphs of VNFMs placed in the system with respect of the number of VNF instances, for (a) 8 PoPs, (b) 16 PoPs and (c) 24 PoPs with $\varepsilon=1$ and $\varepsilon=20$, in accordance with some embodiments.
Figure 12B:
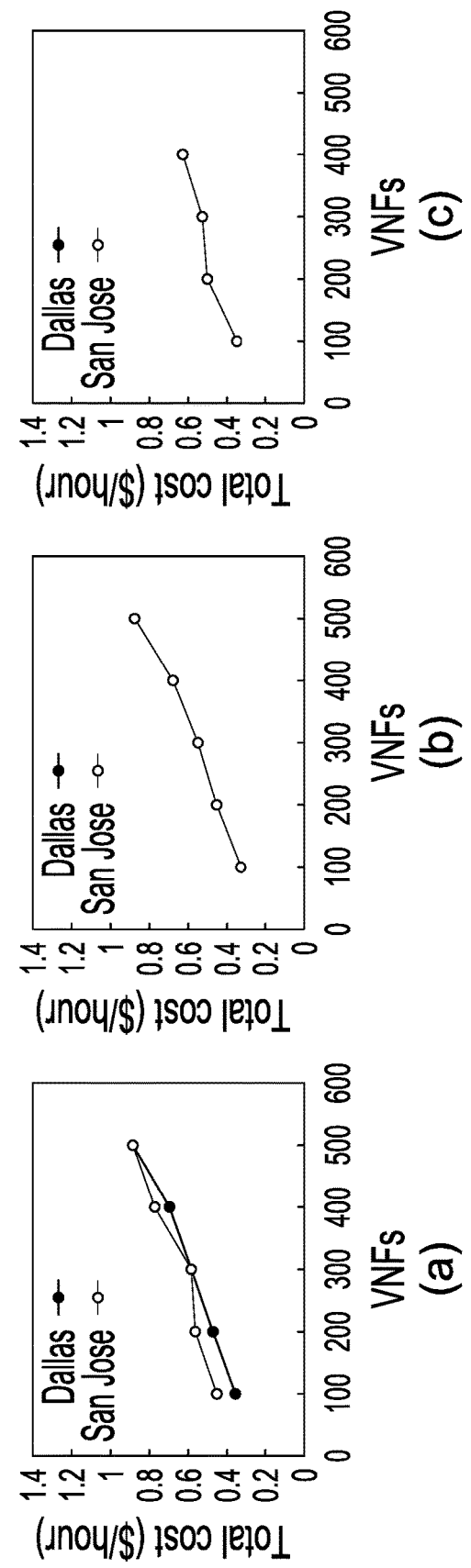
FIG. 12b illustrates graphs showing total cost for optimal solutions, for (a) 8 PoPs, (b) 16 PoPs and (c) 24 PoPs with $\varepsilon=1$, in accordance with some embodiments.
Figure 12C:
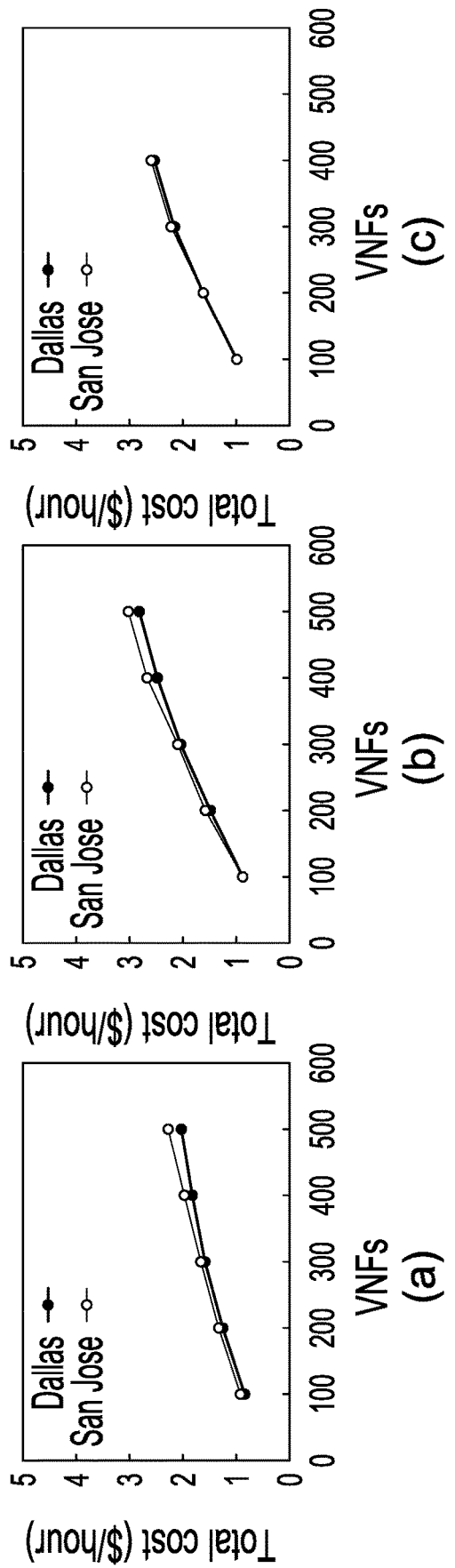
FIG. 12c illustrates graphs showing total cost for optimal solutions, for (a) 8 PoPs, (b) 16 PoPs and (c) 24 PoPs with $\varepsilon=20$, in accordance with some embodiments.

Focusing on the objective function, it is noted that c comes balancing two metrics: on the one hand, the compute resource cost and on the other hand the lifecycle management cost (i.e. bandwidth consumed in the life cycle management). The bigger the value of $\varepsilon$, the more placement in the light of minimizing the lifecycle management cost is favored. With the uniform bandwidth cost over communication links between each couple of NFVI-PoPs, this translates into favoring the placement of additional VNFMs over the same PoPs of the VNF instances they are managing. Such a placement clearly results in less traffic over the communication links among NFVI-PoPs, as the lifecycle management traffic would be circulating inside the same NFVI-PoP, at no cost. In FIG. 12a the number of VNFMs placed in the system is investigated, with respect to the number of VNF instances, for 8 (a), 16 (b) and 24 (c) NFVI-PoPs, with the NFVO placed in Dallas, considering $\varepsilon=1$ and 20. There, a clear jump is noticed in the number of VNFMs in the case of $\varepsilon=20$ compared to $\varepsilon=1$. Interestingly, deeper investigations allowed to observe that the additional VNFMs are all of the C1 type. That is due to the fact that the management of C1 VNF instances consumes more bandwidth, compared to C2 VNF instances, in the evaluation scenarios.

Impact of NFVO Location

Next is investigated how the NFVO location affects the results of the VNFM placement. The total cost of the optimal solutions was compared when the NFVO is placed in Dallas and when the NFVO is placed in San Jose. The results are plotted in FIG. 12b and FIG. 12c for ε=1 and ε=20 respectively. They are derived for 8 (a), 16 (b) and 24 (c) NFVI-PoPs. In both figures, when the NFVO is placed in San Jose, the total cost can record slightly higher values, with respect to the case of placing it in Dallas. Going back to the geographical distribution of NFVI-PoPs over the country in FIG. 10, it is noticed that San Jose is far from many of the NFVI-PoPs. This translates into less flexibility in the system, due to the imposed latency over a communication link between a VNFM and the NFVO. As a result, VNFMs are constrained to a smaller set of NFVI-PoPs, preventing additional cost gains.

Architectural Options Related to VNFM

Figure 13A:
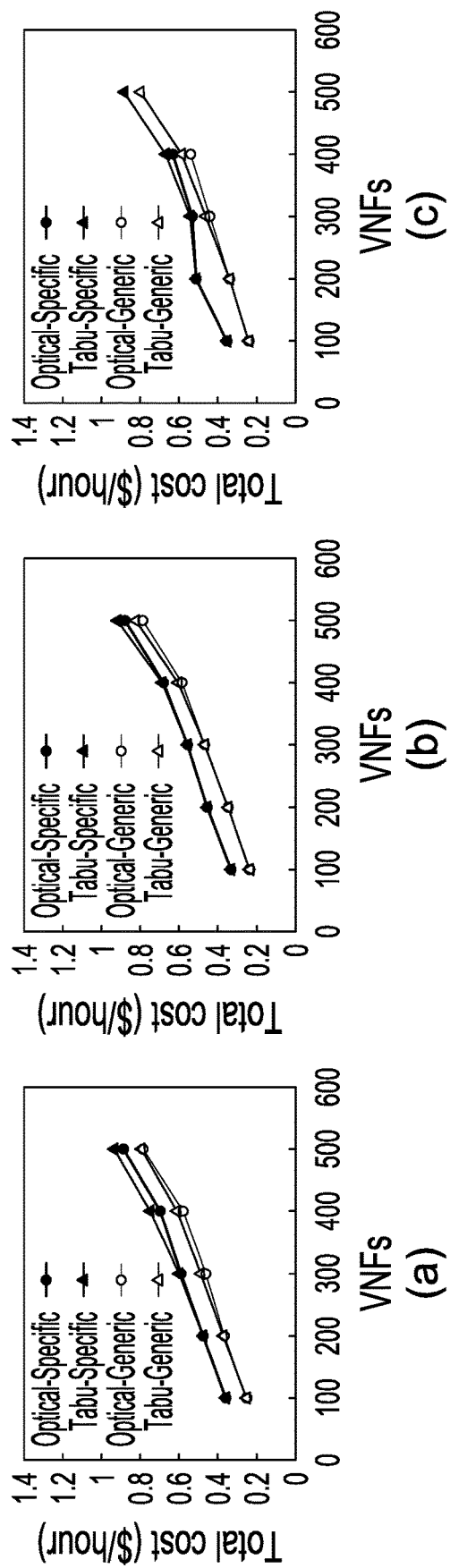
FIG. 13a illustrates graphs showing total cost for optimal and tabu solutions, for (a) 8 PoPs, (b) 16 PoPs and (c) 24 PoPs with $\varepsilon=1$, in accordance with some embodiments.
Figure 13B:
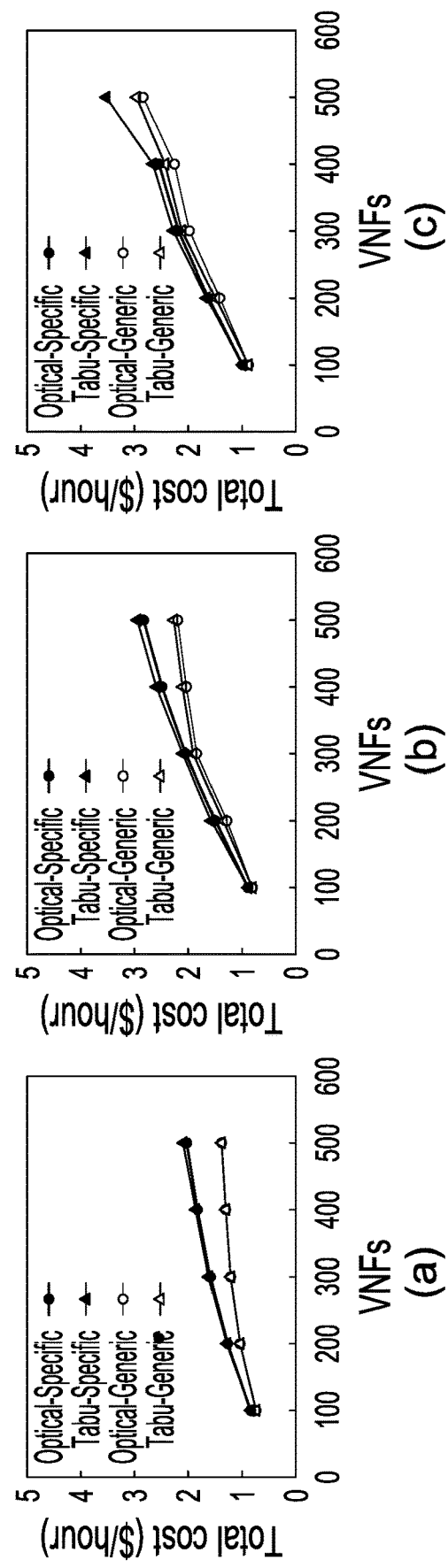
FIG. 13b illustrates graphs showing total cost for optimal and tabu solutions, for (a) 8 PoPs, (b) 16 PoPs and (c) 24 PoPs with $\varepsilon=20$, in accordance with some embodiments.

FIG. 13a and FIG. 13b depict the total operational cost for the optimal and tabu search solutions, for ε=1 and ε=20 respectively, considering the VNF-specific and generic options, for 8 (a), 16 (b) and 24 (c) NFVI-PoPs when the NFVO is placed in Dallas. Cost reductions of up to 34.8% are obtained when the generic VNFM is used instead of the VNF-specific. The VNF-specific VNFM can handle one VNF class within the evaluation scenarios. Therefore, in this case, the system has to place two distinct set of VNFMs to manage the C1 and C2 classes. This leaves many VNFMs with unutilized capacity since the number of VNF instances per class is relatively small. However, when the generic VNFM is adopted, one set of VNFMs manages all VNF instances. The system maximizes the capacity utilization of the VNFMs, resulting in the placement of fewer VNFMs.

Large-Scale Deployment

Figure 14A:
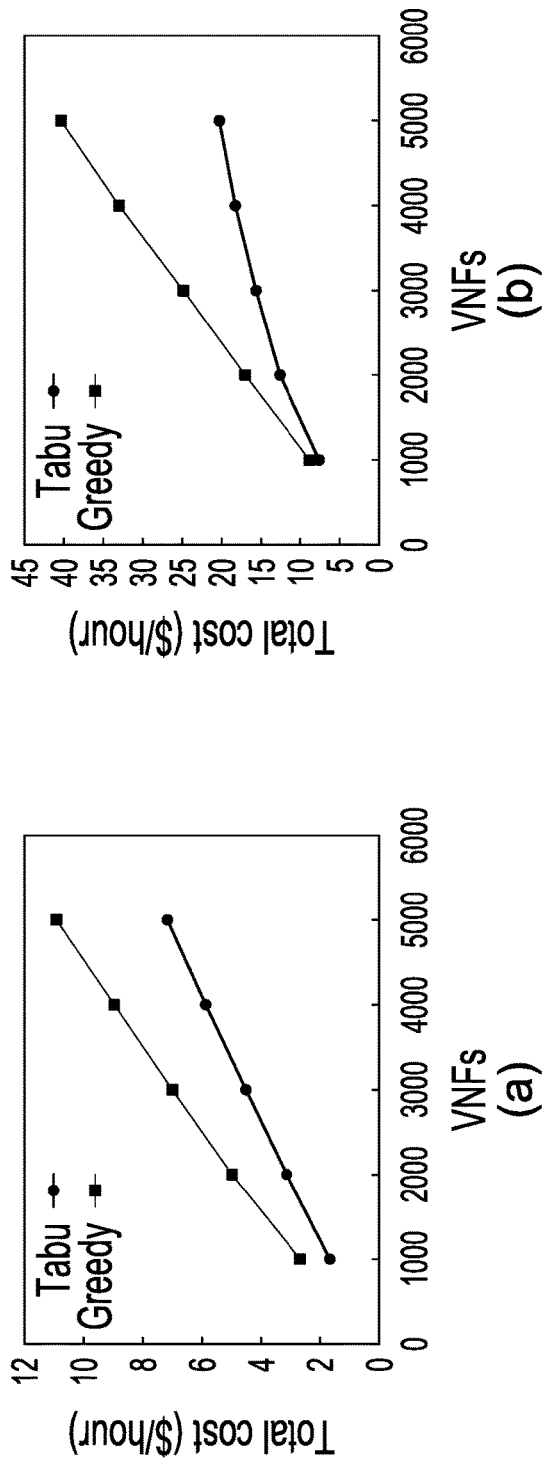
FIG. 14a illustrates graphs showing cost for tabu and greedy solutions, for (a) $\varepsilon=1$ and (b) $\varepsilon=20$, in accordance with some embodiments.
Figure 14B:
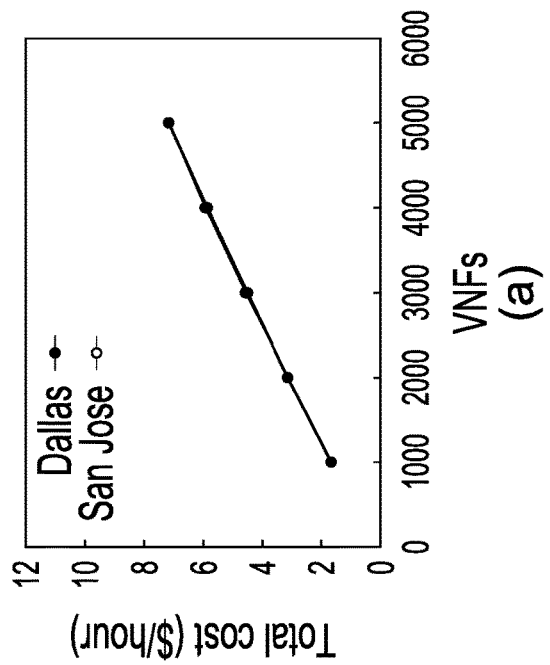
FIG. 14b illustrates graphs showing cost for tabu solutions, for (a) $\varepsilon=1$ and (b) $\varepsilon=20$, in accordance with some embodiments.

The solutions obtained by tabu search and first-fit algorithms for large-scale deployments are illustrated in FIG. 14a. The results are reported for ε=1 and ε=20 and considering the NFVO is placed in Dallas. As shown, the tabu search outperforms the first-fit and yields up to 49.8% reduction in the operational cost. The operational cost is further compared with respect to the NFVO location in FIG. 14b. The results are reported for ε=1 and ε=20 and considering the NFVO is placed in Dallas and in San Jose. It is observed that the results are similar to those obtained in the small-scale deployments. More precisely, when ε=20 and the NFVO is in San Jose, higher total operational costs can be obtained, with respect to the case when the NFVO is in Dallas. The difference in the cost between the two scenarios is proportional to the deployment size, i.e. the number of VNF instances in the system.

Dynamic Placement Evaluation

Figure 15:
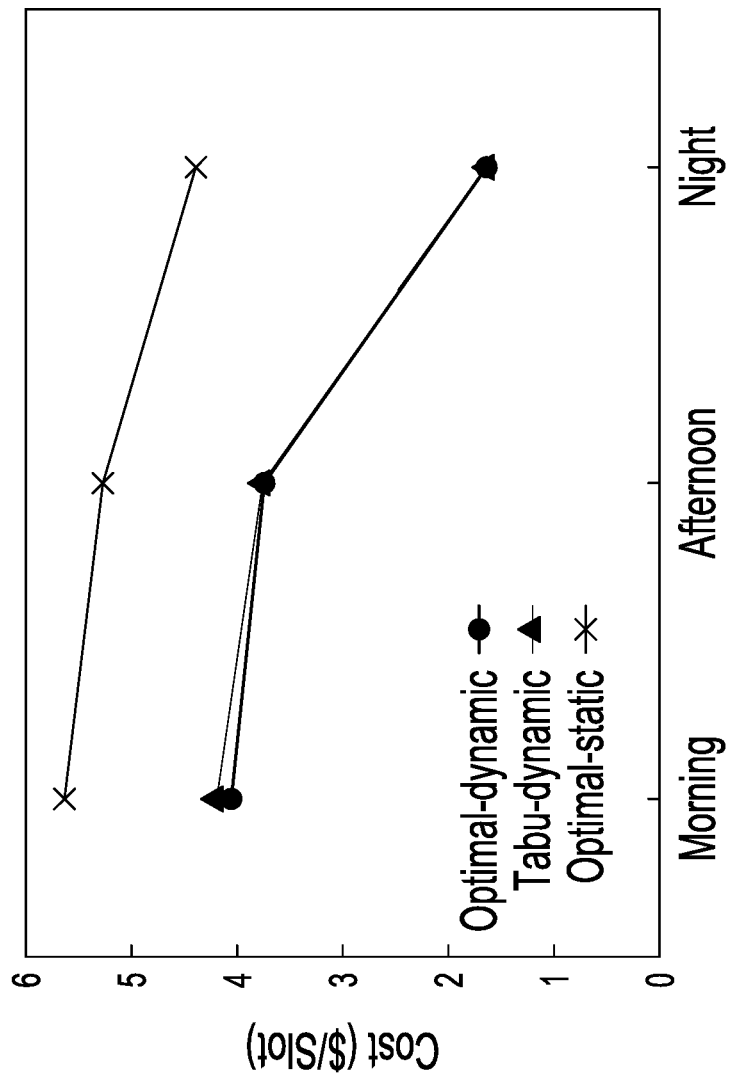
FIG. 15 illustrates a graph showing total cost for optimal and tabu solutions, in accordance with some embodiments.

FIG. 15 shows the operational cost for managing the VNF instances, with respect to the time-slot. The cost for a time-slot is the total cost of 8 snapshots and is derived using the static and dynamic versions of MPP. Considering the static MPP, the system manages the VNF instances through the over-provisioning of VNFMs. The problem is solved with respect to the maximum number of VNF instances in the system, i.e. 225 VNF instances for each VNF class. The depicted operational cost is the sum of VNFM resource cost ($C^{com}(t)$) and lifecycle management cost ($C^{lif}(t)$) per time-slot. $C^{com}(t)$ is fixed over snapshots whereas $C^{lif}(t)$ is incurred for a VNF instance only during its lifetime in the system. The FIG. 15 reports the operational cost of the dynamic MPP corresponding to the optimal solution and tabu search-based solution. The numerical results confirm the quality of the obtained tabu search solution in the dynamic MPP. They also show that operational cost of the static MPP is significantly higher by 38.8% to 168.3% compared to the dynamic MPP over all time-slots. The superiority of the dynamic MPP emerges from its ability to adapt the system to the variation in the VNFs workload. It can scale out and scale-in the number of VNFM, change the VNFM locations and change the associations between the VNFMs with VNF instances.

Any appropriate steps, methods, features, functions, or benefits disclosed herein may be performed through one or more functional units or modules of one or more virtual apparatuses. Each virtual apparatus may comprise a number of these functional units which may be implemented via suitable hardware.

Figure 16:
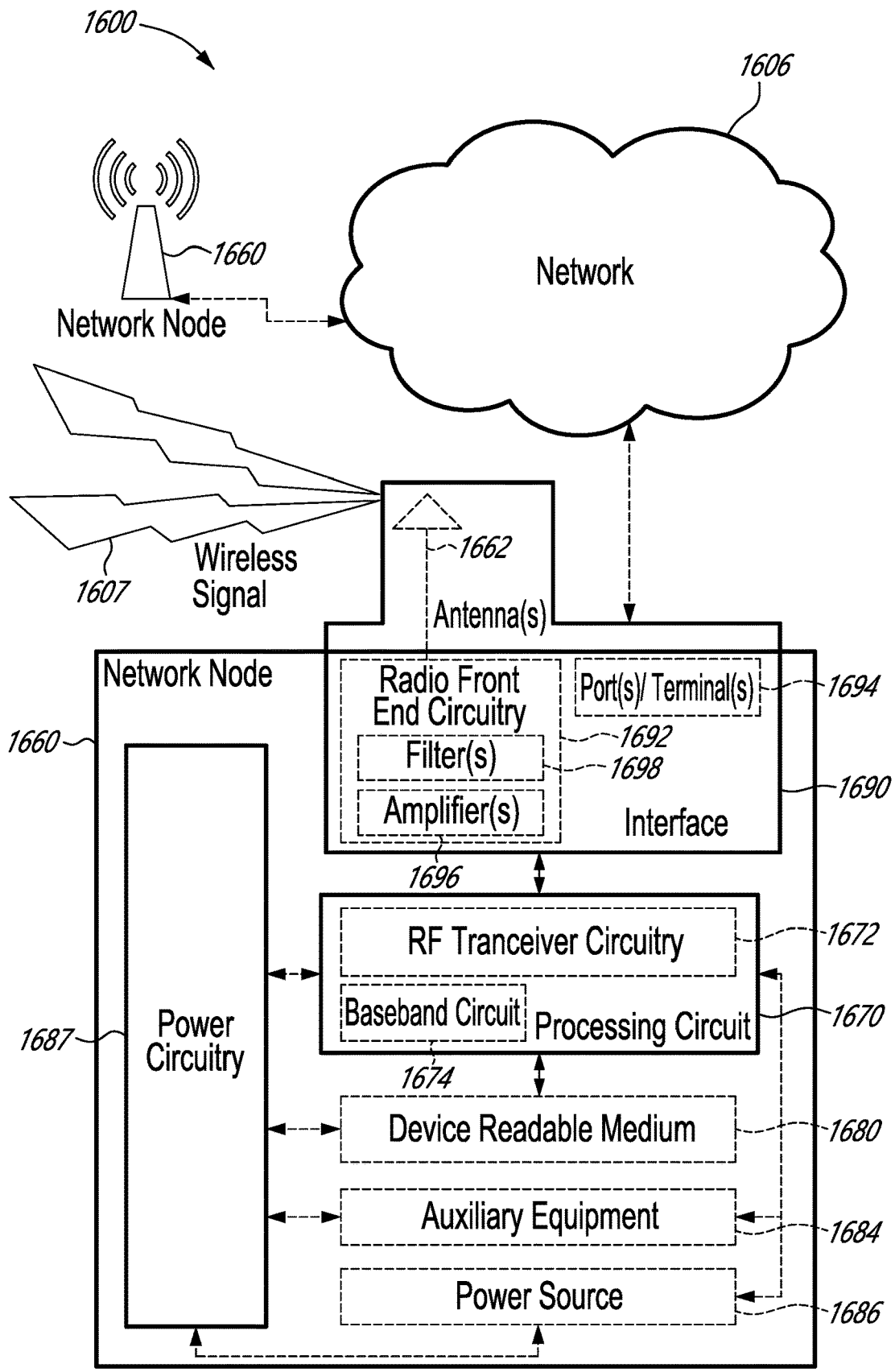
FIG. 16 is a schematic illustration of a network node in accordance with some embodiments.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components, which may each have their own respective components. In certain scenarios in which network node 1660 comprises multiple separate components, one or more of the separate components may be shared among several network nodes.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

According to an embodiment, there is provided a network node 1660 operative to execute placement of virtual network functions managers (VNFMs) in a network functions virtualization (NFV) system. The network node 1660 comprises processing circuits and a memory, the memory containing instructions executable by the processing circuits. The network node 1660 is operative to determine a number of VNFMs for the NFV system; determine a type for each VNFM; determine a placement for each VNFM over distributed Network Function Virtualization Infrastructure Points of Presence (NFVI-PoPs); and determine a plurality of associations between the VNFMs and VNF instances in the system, thereby generating a VNFMs placement solution.

The network node may further be operative to execute any one of the steps of the methods described herein.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

According to an embodiment, there is provided a non-transitory computer readable media 1680 having stored thereon instructions for placement of virtual network functions managers (VNFMs) in a network functions virtualization (NFV) system. The instructions comprise determining a number of VNFMs for the NFV system; determining a type for each VNFM; determining a placement for each VNFM over distributed Network Function Virtualization Infrastructure Points of Presence (NFVI-PoPs); and determining a plurality of associations between the VNFMs and VNF instances in the system, thereby generating a VNFMs placement solution.

The non-transitory computer readable media 1680 may further have stored thereon instructions to execute any one of the steps of the methods described herein.

Interface 1690 is used in the wired or wireless communication of signaling and/or data between network node 1660 and network 1606. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 16 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

Figure 17:
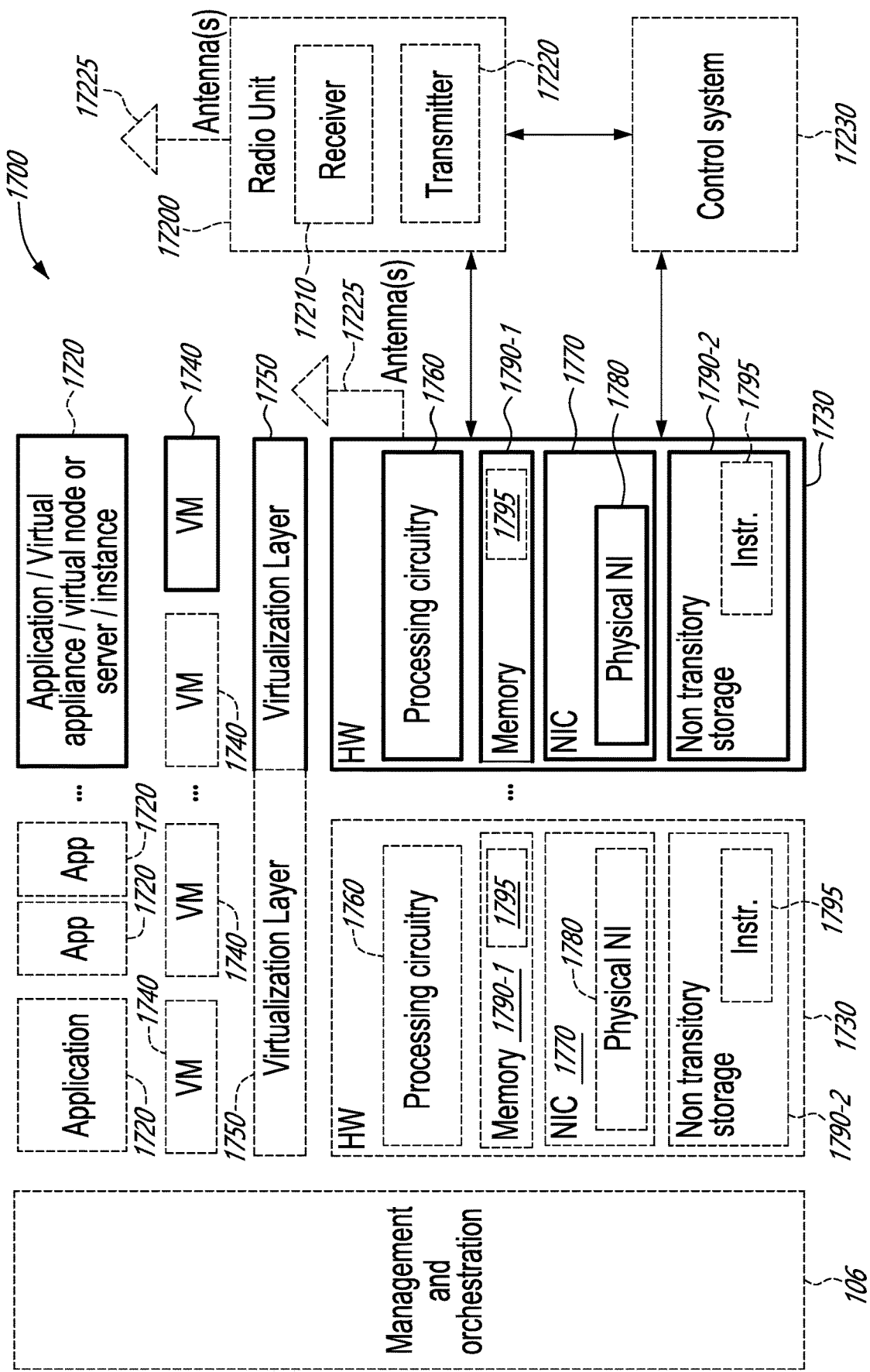
FIG. 17 is a schematic illustration of a virtualization environment in accordance with some embodiments.

FIG. 17 is a schematic block diagram illustrating a virtualization environment 1700. Virtualization environment 1700, comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analog hardware components or special purpose processors. Each hardware device may comprise memory 1790-1 which may be non-persistent memory for temporarily storing instructions 1795 or software executed by processing circuitry 1760. Each hardware device may comprise one or more network interface controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine 1740.

As shown in FIG. 17, hardware 1730 may be a standalone network node with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE)) where many hardware nodes work together and are managed via management and orchestration (MANO) 106, which, among others, oversees lifecycle management of applications 1720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 may be coupled to one or more antennas 17225. Radio units 17200 may communicate directly with hardware nodes 1730 via one or more appropriate network interfaces and may be used in combination with the virtual components to provide a virtual node with radio capabilities, such as a radio access node or a base station.

The virtualisation environment 1700 may be operative to execute any one of the steps of the methods described herein in a local (application(s) 1720 or VM(s) 1740 running on one hardware 1730) or in a distributed manner (application(s) 1720 or VM(s) 1740 running on many hardware 1730).

The invention claimed is:

1. A method for placement of virtual network functions managers (VNFMs) in a network functions virtualization (NFV) system, comprising:
   determining a number of VNFMs for the NFV system;
   determining a type for each VNFM;

generating a set of neighbor VNFMs placement solutions, each VNFM placement solution being generated by determining a plurality of associations between the VNFMs and VNF instances in the system, and each VNFM placement solution determining a placement for each VNFM over distributed Network Function Virtualization Infrastructure Points of Presence (NFVI-PoPs);

selecting a VNFMs placement solution among the set of VNFMs placement solutions which minimizes operational cost; and placing the VNFMs on the NFVI-PoPs, assigning the VNF instances to the VNFMs according to the VNFMs placement solution and activating the VNFMs.

2. The method of claim 1, wherein the set of neighbor VNFMs placement solutions comprise a current VNFMs placement solution.

3. The method of claim 1, wherein the determining the best VNFMs placement solution is executed iteratively until a termination criterion is satisfied.

4. The method of claim 3, wherein generating the set of neighbor VNFMs placement solutions comprises:
   randomly selecting a VNF currently assigned to a first active VNFM;
   assigning the VNF to a second VNFM of a same type;
   activating the second VNFM, if the second VNFM is inactive; and
   deactivating the first active VNFM, if there are no associations between the first active VNFM and other VNF instances.

5. The method of claim 3, wherein generating the set of neighbor VNFMs placement solutions comprises:
   randomly selecting an active VNFM with a placement on a first NFVI-PoP;
   randomly selecting a second NFVI-PoP, different from the first NFVI-PoP; and
   relocating the randomly selected active VNFM to the randomly selected second NFVI-PoP.

6. The method of claim 3, wherein generating the set of neighbor VNFM placement solutions comprises:
   randomly selecting an active VNFM;
   upon determining that other active VNFM of a same type have enough capacity to manage VNFs assigned to the randomly selected active VNFM while satisfying delay constraints, reassigning each VNF assigned to the selected active VNFM to any one of the other active VNFM that has enough capacity to manage the VNF; and
   deactivating the randomly selected active VNFM.

7. The method of claim 3, wherein generating the set of neighbor VNFM placement solutions comprises:
   randomly selecting a first active VNFM;
   randomly selecting a second active VNFM, different from the first active VNFM;
   finding an intersection of respective first and second subsets of NFVI-PoPs where the first and the second active VNFMs can be placed while satisfying respective delay constraints for all VNF instances assigned to the first and the second active VNFMs;
   reassigning all VNFs assigned to the second active VNFM to the first active VNFM if the intersection of the respective first and second subsets of NFVI-PoPs is not empty and if the first active VNFM has enough capacity to manage the VNFs and deactivating the second active VNFM; and
   relocating the first active VNFM to another NFVI-PoP randomly selected from intersection of respective first and second subsets of NFVI-PoPs if the NFVI-PoP where the first active VNFM is located doesn't belong to the intersection of respective first and second subsets of NFVI-PoPs.

8. The method of claim 1, wherein the operational cost is the sum of a VNFM resource cost, a VNFs lifecycle management cost over time period, a VNFM migration cost and a VNFs reassignment cost, a penalty value proportional to a level of violation of system constraints generated by the neighbor solution, and a sum of delays between active VNFMs and associated VNF instances for the neighbor solution.

9. A network node operative to execute placement of virtual network functions managers (VNFMs) in a network functions virtualization (NFV) system, the network node comprising processing circuits and a memory, the memory containing instructions executable by the processing circuits whereby the network node is operative to:
   determine a number of VNFMs for the NFV system;
   determine a type for each VNFM;
   generate a set of neighbor VNFMs placement solutions, each VNFM placement solution being generated by determining a plurality of associations between the VNFMs and VNF instances in the system, and each VNFM placement solution determining a placement for each VNFM over distributed Network Function Virtualization Infrastructure Points of Presence (NFVI-PoPs);
   select a VNFMs placement solution among the set of VNFMs placement solutions which minimizes operational cost; and
   place the VNFMs on the NFVI-PoPs, assign the VNF instances to the VNFMs according to the VNFMs placement solution and activate the VNFMs.

10. A non-transitory computer readable media having stored thereon instructions for placement of virtual network functions managers (VNFMs) in a network functions virtualization (NFV) system, the instructions comprising:
   determining a number of VNFMs for the NFV system;
   determining a type for each VNFM;
   generating a set of neighbor VNFMs placement solutions, each VNFM placement solution being generated by determining a plurality of associations between the VNFMs and VNF instances in the system, and each VNFM placement solution determining a placement for each VNFM over distributed Network Function Virtualization Infrastructure Points of Presence (NFVI-PoPs);
   selecting a VNFMs placement solution among the set of VNFMs placement solutions which minimizes operational cost; and
   placing the VNFMs on the NFVI-PoPs, assigning the VNF instances to the VNFMs according to the VNFMs placement solution and activating the VNFMs.

* * * * *